US005255420A

United States Patent [19]

Maejima et al.

[11] Patent Number: 5,255,420

[45] Date of Patent: Oct. 26, 1993

[54] PLATE REPLACING APPARATUS FOR A PRINTING PRESS

[75] Inventors: Kazuhiro Maejima; Hisaaki Oyoshi; Toshio Miyamoto, all of Ibaraki, Japan

[73] Assignee: Komori Corporation, Japan

[21] Appl. No.: 950,747

[22] Filed: Sep. 24, 1992

Related U.S. Application Data

[63] Continuation of Ser. No. 633,080, Dec. 19, 1990, abandoned.

[30] Foreign Application Priority Data

Dec. 26, 1989 [JP] Japan ................................ 1-337338
Apr. 3, 1990 [JP] Japan ................................ 2-87439
Dec. 26, 1990 [JP] Japan ................................ 2-149750[U]

[51] Int. Cl.5 ........................ B23P 19/04; B41F 27/00

[52] U.S. Cl. ................................ 29/240; 29/402.08; 101/217

[58] Field of Search .................. 29/240, 240.5, 402.01, 29/402.03, 402.08, 118, 771, 779, 782; 101/216, 217, 247, 248

[56] References Cited

U.S. PATENT DOCUMENTS 4,563,949 1/1986 Rogge ............................ 101/216 X
4,581,993 4/1986 Schoneberger ..................... 101/217

FOREIGN PATENT DOCUMENTS 268857 6/1988 European Pat. Off. .
727471 6/1932 France ................................ 101/217
11874 1/1980 Japan .
227057 10/1986 Japan .
62-759 3/1987 Japan .
207649 8/1988 Japan .
221049 9/1924 United Kingdom ................ 101/217
817354 7/1959 United Kingdom ................ 101/217
1083384 9/1967 United Kingdom ................ 101/217

*Primary Examiner*—Mark Rosenbaum
*Assistant Examiner*—Peter Dungba Vo
*Attorney, Agent, or Firm*—Blakely, Sokoloff, Taylor & Zafman

[57] ABSTRACT

In a plate replacing apparatus for a printing press, a plate lockup opening/closing unit opens/closes leading- and trailing-side plate lockup devices upon pivotal movement of a cam shaft. A loader drive unit drives a loader on the plate replacing apparatus between an operation position where a distal end portion of the loader comes close to the plate lockup devices and a storage position where the distal end portion of the loader is separated from the plate lockup devices. A plate removal unit grips an old plate released from the plate lockup devices and inserted into the loader upon rotation of the plate cylinder, and moves the old plate into the loader. A plate supply unit inserts a new plate loaded in the loader into the leading-side plate lockup device. A plate press unit presses the new plate inserted into the leading-side plate lockup device and wound around the circumferential surface of the plate cylinder and inserts the other end of the new plate into the trailing-side plate lockup device. A predetermined plate position stop unit pivots the plate cylinder to stop at a plate gripper position. A controller operates the above apparatus and units.

2 Claims, 19 Drawing Sheets

PLATE REPLACING APPARATUS FOR A PRINTING PRESS

This is a continuation of application Ser. No. 07/633,080 filed Dec. 19, 1990.

BACKGROUND OF THE INVENTION

The present invention relates to a method of replacing a plate in a printing press and an apparatus therefor wherein an old plate which is mounted on the circumferential surface of a plate cylinder and the two ends of which are gripped by plate lockup devices is replaced with a new plate prepared outside the plate replacing apparatus.

A gap is formed along the entire length in the outer circumference of each plate cylinder in a printing press. A plate lockup apparatus consisting of a leading-side lockup device for gripping the leading edge of the plate and a trailing-side lockup device for gripping the trailing edge of the plate is fixed on the bottom surface of the gap to extend in the axial direction of the plate cylinder. In a multicolor printing press, one plate cylinder is arranged in each printing unit, and the plate lockup device is arranged in each plate cylinder.

Each of the conventional leading- and trailing-side lockup devices comprises an elongated lockup table extending in the axial direction of the plate cylinder, a plurality of gripper plates, arranged in tandem with each other in the axial direction of the plate cylinder and swingably supported at an edge portion of this lockup table by a plurality of bolts, for gripping or releasing the plate with or from the lockup table, and a pivotal cam shaft having a plurality of cams which can be respectively engaged with gaps at the edges of the gripper plates. The plurality of cams are pivotally aligned along the axis of the plate cylinder. A plurality of compression coil springs are interposed between the lockup table and the gripper plates to bias the gripper plates in an open direction.

With the above arrangement, in order to mount a plate on a plate cylinder, when a cam shaft of the leading-side lockup device is pivoted, the gripper plates which are divided in the axial direction of the plate cylinder are released upon disengagement from the cams and are simultaneously opened by the elastic forces of the compression coil springs. An end of the plate is inserted between the leading-side lockup device and the corresponding lockup table. When the cam plate is pivoted in the direction opposite to the direction described above, the gripper plates are pivoted against the elastic forces of the compression coil springs by the behavior of the cams and are closed, thereby gripping the leading edge of the plate.

Another conventional apparatus is disclosed in Japanese Patent Laid-Open No. 1-127346. In this apparatus, the lockup tables and the gripper plates are disposed in the radial direction of a plate cylinder so that a trailing-side gripper surface of the plate conventionally formed in the circumferential direction of the plate cylinder is formed in the radial direction of the plate cylinder. The edge of the plate is bent at a right angle by an external bending machine so as to cause the gripper surfaces to grip the bent edge. With this arrangement, after the leading edge of the plate is gripped, the bent portion of the trailing edge portion of the plate wound around the circumferential surface of the plate is inserted between the lockup tables and the gripper plates. The gripper plates are swung by a cam mechanism to grip the bent portion of the plate. The trailing-side lockup device as a whole is circumferentially moved to uniformly mount the plate, thereby bringing the plate into tight contact with the surface of the plate cylinder.

In such a conventional press, when an old plate is replaced with a new plate due to changes in contents of printed matters, the trailing-side cam shaft is pivoted to open the trailing-side lockup device. One end of the plate which is released from gripping is kept held, and the plate cylinder is rotated. The leading-side cam shaft is pivoted to open the leading-side lockup device to release the other end of the plate from gripping, thereby removing the old plate. Thereafter, opening/closing of the plate lockup devices and the pivotal operation of the plate cylinder are repeated to mount the new plate.

The following two conventional methods are employed as plate replacing methods in multicolor printing presses. According to the first method, removal of an old plate and supply of a new plate are performed in units of printing units. More specifically, at the time of plate replacement, a plate cylinder of each printing unit is pivoted to a plate removal position, and the leading- and trailing-side plate lockup devices are opened. The plate cylinder is rotated in the reverse direction to remove the old plate. The plate cylinder is then pivoted to a plate supply position, and one end of the new plate is gripped by the leading-side plate lockup device. The plate cylinder is then rotated in the forward direction to wind the plate around the circumferential surface of the plate cylinder. The other end of the plate is then gripped by the trailing-side plate lockup device. The plate is then uniformly kept taut and is therefore brought into tight contact with the circumferential surface of the plate cylinder. The above operations are repeated in units of printing units, thereby completing the plate exchange operations.

According to the second method, for example, the plate removal operations are repeated from the printing unit of the fourth color to the printing unit of the first color, and the plate supply operations are then repeated from the printing unit of the first color to the printing unit of the fourth color.

In the plate replacing method and apparatus in the conventional printing press, however, pivotal movement of the cam shaft for opening/closing the plate gripper surfaces and rotation of the plate cylinder must be performed manually or upon operation of a push button. The number of operation steps is increased, workability is degraded, much labor is required. In addition, the preparation time is undesirably prolonged to degrade productivity. In particular, plate replacement is cumbersome and requires skills since the old and new plates must be manually held. In addition, the new plate cannot be placed to stand by at a mounting position of the plate cylinder during printing. The old plate must be removed from the press during the replacement. A preparation period is therefore undesirably prolonged, and productivity is degraded. In addition, automatic plate replacement cannot be performed due to a requirement of plate holding.

As described above, since the motor is connected to the drive shaft via a belt, when the plate exchange apparatus is added, the distal end portion of the plate exchange apparatus does not accurately oppose the gripper surfaces of the plate lockup devices due to slippage and contraction of the belt. A gripping failure may thus occur. If the motor and the drive shaft are connected via gears or a chain, this arrangement may pose serious safety problems.

In the conventional plate replacing method, at least a sum of the plate removal times and the plate supply times of the respective printing units is required as a total plate exchange period. The plate exchange period cannot be shortened.

SUMMARY OF THE INVENTION

It is an object of the present invention to provide a plate replacing apparatus for a printing press, capable of eliminating skills, achieving energy savings, and greatly shortening a preparation time.

It is another object of the present invention to provide a plate replacing apparatus for a printing press, capable of improving operation precision and eliminating operational errors.

It is still another object of the present invention to provide a method of replacing a plate in a printing press, wherein a preparation time can be shortened, the operation efficiency of the printing press can be improved, and the number of revolutions of the plate cylinder can be reduced.

According to an aspect of the present invention, there is provided a plate replacing apparatus for a printing press having a plate fixing apparatus consisting of a leading-side plate lockup device for gripping one end of a plate wound around a circumferential surface of a plate cylinder and a trailing-side plate lockup device for gripping the other end of the plate, the plate fixing apparatus being arranged in a gap in the circumferential surface of the plate cylinder, comprising a plate lockup opening/closing unit, connected to the leading- and trailing-side plate lockup devices through a cam shaft, for opening/closing the leading- and trailing-side plate lockup devices upon pivotal movement of the cam shaft, a plate holding apparatus drive unit for driving a plate holding apparatus on the plate replacing apparatus between an operation position where a distal end portion of the plate holding apparatus comes close to the plate lockup devices and a storage position where the distal end portion of the plate holding apparatus is separated from the plate lockup devices, a plate removal unit for gripping an old plate released from the plate lockup devices and inserted into the plate holding apparatus upon rotation of the plate cylinder, and for moving the old plate into the plate holding apparatus, a plate supply unit for inserting a new plate loaded in the plate holding apparatus into the leading-side plate lockup device, a plate press unit for pressing the new plate inserted into the leading-side plate lockup device and wound around the circumferential surface of the plate cylinder and for inserting the other end of the new plate into the trailing-side plate lockup device, a predetermined plate position stop unit for pivoting the plate cylinder to stop at a plate gripper position, and a controller for operating the plate lockup opening/closing unit, the plate holding apparatus drive unit, the plate removal unit, the plate supply unit, the plate press unit, and the predetermined plate position stop unit at predetermined timings.

According to another aspect of the present invention, there is provided a method of replacing an old plate mounted on a circumferential surface of each of first to Nth plate cylinders with a new plate, comprising the steps of stopping a Jth ($1 \leqq J < N$) plate cylinder at a plate removal position thereof to remove an old plate from the Jth plate cylinder, synchronously rotating the first to Nth plate cylinders in a reverse direction, stopping a Kth ($J < K \leqq N$) plate cylinder at a plate removal position thereof to remove an old plate from the Kth plate cylinder, synchronously rotating the first to Nth plate cylinders in the reverse direction until an old plate is removed from the Nth plate cylinder, stopping the Nth plate cylinder at a plate supply position thereof to supply a new plate thereto, synchronously rotating the first to Nth plate cylinders in a normal direction, stopping the Kth plate cylinder at a plate supply position thereof to supply a new plate thereto, synchronously rotating the first to Nth plate cylinders in the normal direction, stopping the Jth plate cylinder at a plate supply position thereof to supply a new plate, and synchronously rotating the first to Nth plate cylinders in the normal direction until a new plate is supplied to the first plate cylinder.

In plate replacement, a gripper member of the plate removal unit is moved to a plate gripper position in the plate holding apparatus (to be referred to as a loader hereinafter), and a new plate is held in the loader. When the plate replacing apparatus is started, the plate cylinder is stopped at the plate removal position, and at the same time, the loader is moved to the plate removal position. At this time, the plate lockup drive unit is operated to simultaneously open the leading- and trailing-side plate lockup devices. When the plate cylinder is rotated, the old plate enters into the loader and is gripped by the gripper member of the plate removal unit. Upon movement of the gripper member, the old plate is stored in the loader. The plate cylinder is then rotated to cause the leading-side plate lockup device to oppose the loader, and the plate holding apparatus of the plate supply unit fixes the plate and is moved, so that the new plate is inserted into the leading-side plate lockup device. At the same time, the plate lockup opening/closing drive unit is driven to close the leading-side plate lockup device, thereby gripping the new plate. The new plate is brought into tight contact with the circumferential surface of the plate cylinder by a roller of a plate press unit while the plate cylinder is rotated. The new plate is wound around the circumferential surface of the plate cylinder. When the plate cylinder is stopped, the press roller of the plate press unit is brought into contact with the other end of the plate. The trailing edge portion of the plate cylinder is urged by the press roller and is gripped by the trailing-side plate lockup device. The loader is moved to be separated from the plate cylinder. When plate replacement is completed, a printing operation is started. The old plate in the loader can be removed any time during printing.

According to the present invention, during printing, the driving gear is moved and disengaged from a driven gear, and the drive shaft is driven by the belt. In plate exchange, in order to stop the plate cylinder at a predetermined position, the driving gear is driven so that the plate cylinder can be accurately stopped at the predetermined position.

According to the present invention, when the second plate cylinder is stopped at the plate removal position during plate removal from the first plate cylinder, removal of the old plate mounted on the second plate cylinder is started. When the third plate cylinder is stopped at the plate removal position during plate removal from the second plate cylinder, plate removal from the third plate cylinder is started. In this manner, when plate removal of all the plate cylinders is completed, the final plate cylinder is stopped at a plate supply position. Assume that the final plate cylinder is given as the Nth plate cylinder. When the (N-1)th plate cylinder is stopped at the plate supply position during plate supply to the Nth plate cylinder, supply of a new plate to the (N-1)th plate cylinder is started. When the (N-2)th plate cylinder is stopped at the plate supply position during supply of a new plate to the (N-1)th plate cylinder, supply of a new plate to the (N-2)th plate cylinder is started. In the same manner as described above, new plates are supplied to all the plate cylinders.

BRIEF DESCRIPTION OF THE DRAWINGS

FIGS. 1 to 15 show an embodiment of a plate exchange apparatus according to the present invention, in which FIG. 1 is a plan view of a plate cylinder which employs the plate exchange apparatus, FIG. 2 is a sectional view of the plate cylinder along the line II—II in FIG. 1, FIG. 3 is a sectional view of the plate cylinder along the line III—III in FIG. 1, FIG. 4 is a sectional view of the plate cylinder along the line IV—IV in FIG. 1;

FIG. 5 is a sectional view of the plate cylinder along the line V—V in FIG. 1, FIG. 6 is a longitudinal sectional view of a trailing-side plate lockup device before a plate is gripped, FIG. 7 is a side view of a plate lockup opening/closing unit, FIG. 8 is a partially cutaway side view of the upper half of the plate exchange apparatus, FIG. 9 is a partially cutaway side view of the lower half of the plate exchange apparatus, FIG. 10 is a side view showing the plate exchange apparatus, FIG. 11 is a side view showing the main part of a plate replacing apparatus which employs the present invention, FIG. 13 is an enlarged front view of a plate lockup opening/closing drive unit, FIG. 14 is a front view of a motor unit, and FIG. 15 is a side view of the motor unit; and FIGS. 16A to 21D are views for explaining a plate replacing method according to the present invention, in which FIGS. 16A to 16D are views for explaining a plate replacing operation performed in accordance with flow charts in FIG. 19A and 19B, FIG. 17 is a schematic side view showing a main part of a four-color printing press which employs the present invention, FIG. 18 is a block diagram of a controller for controlling the overall automatic plate replacing operation in the four-color printing press, FIGS. 21A to 21D are views for explaining phases of the plate cylinder of the first color and the plate cylinders of other colors when the printing unit of the first color is located at the plate supply position.

DESCRIPTION OF THE PREFERRED EMBODIMENT

Figure 1:
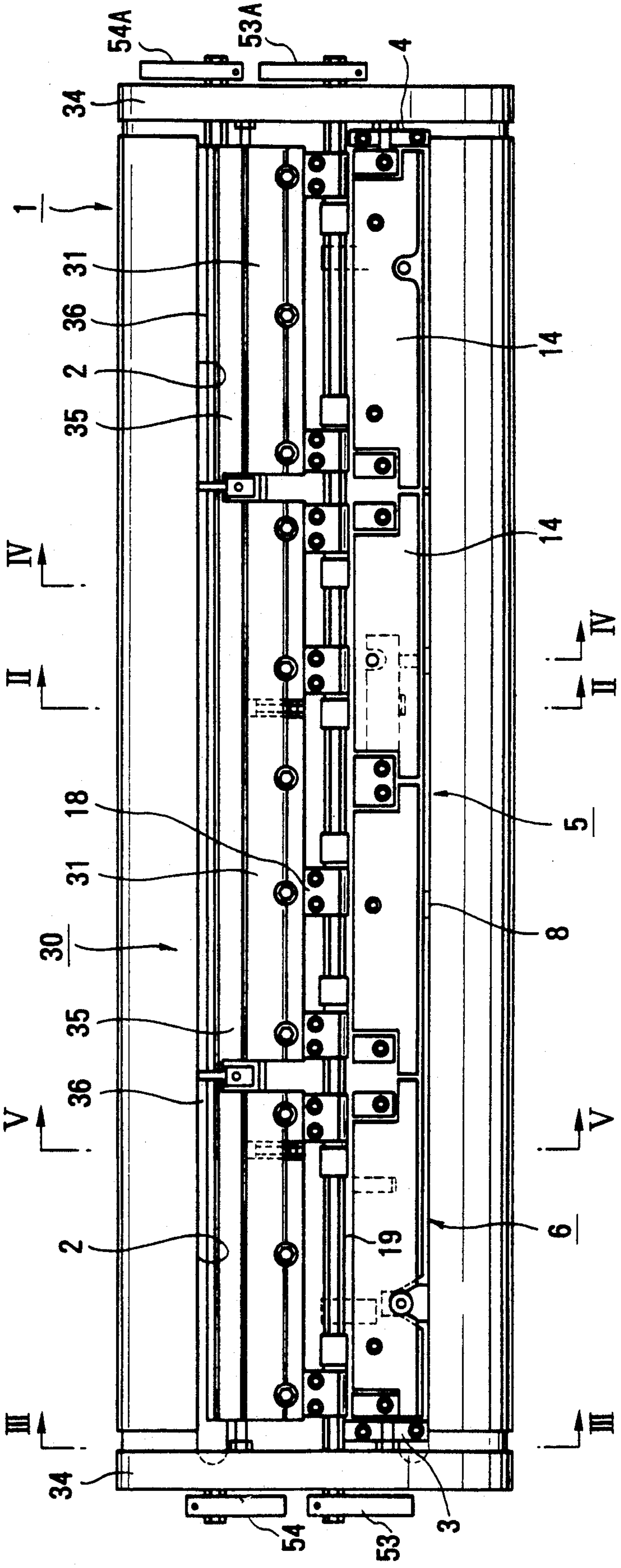
Figure 2:
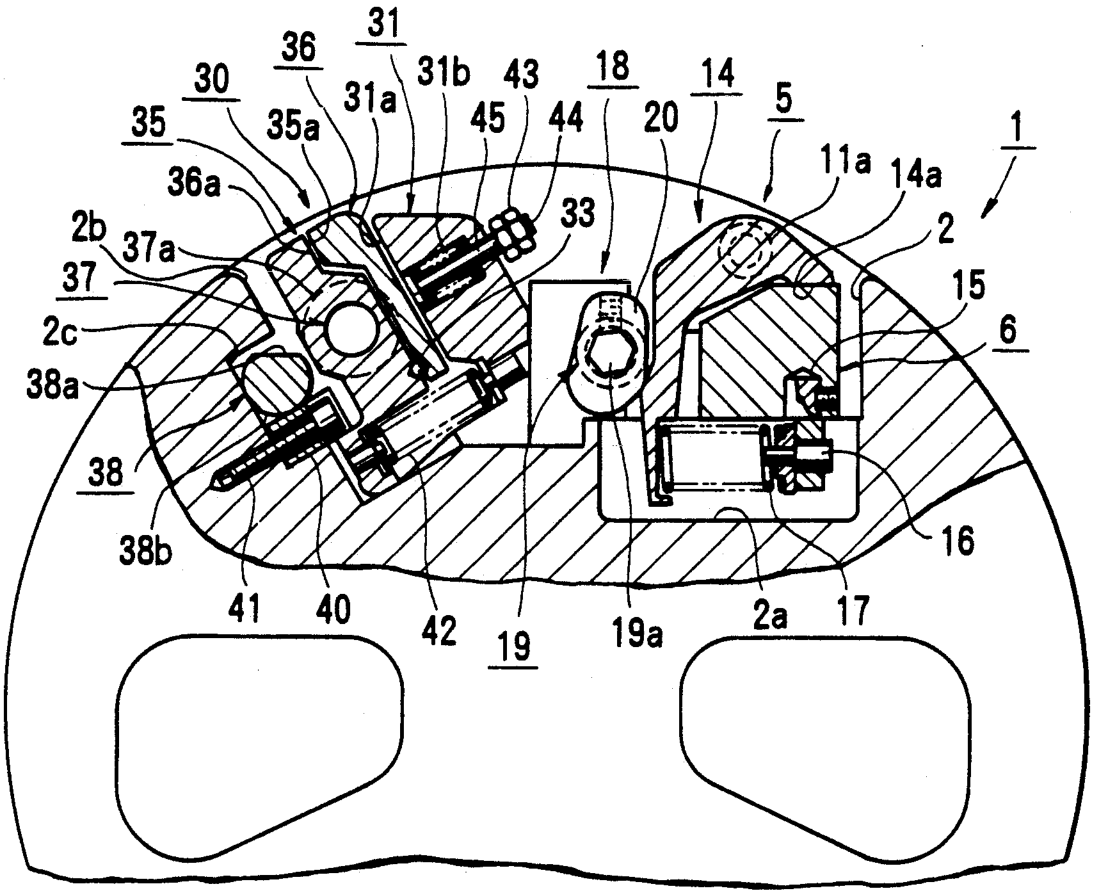
Figure 3:
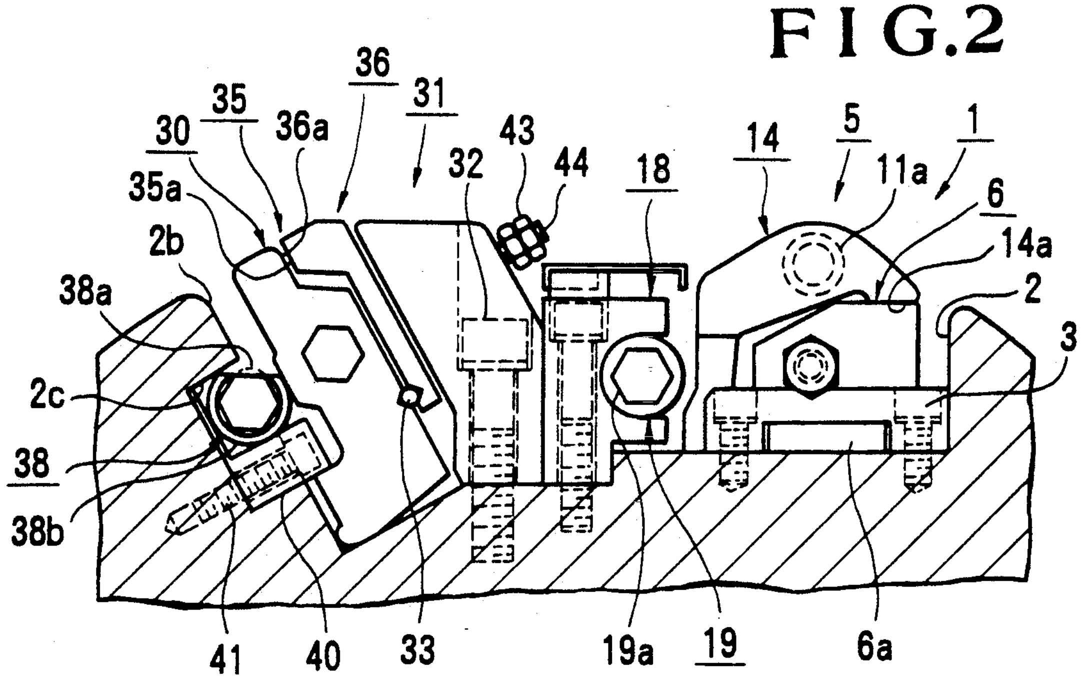
Figure 4:
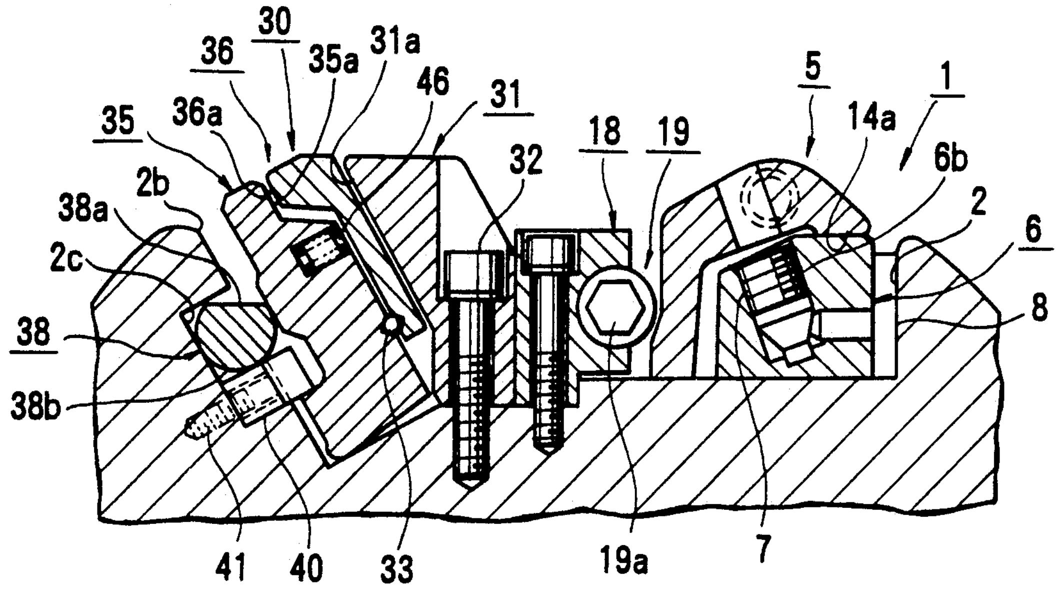

FIGS. 1 to 15 show an embodiment in which a plate exchange apparatus according to the present invention is employed in an automatic plate replacing apparatus.

A gap 2 having a substantially rectangular sectional shape is formed in the outer circumferential surface of a plate cylinder 1 along the entire length of the plate cylinder 1. Saddle-like guides 3 and 4 are bolted on the bottom surface portions of the gap 2 at its two ends. A leading-side plate lockup device 5 comprises a lockup table 6 having an almost square sectional shape and extending in the axial direction of the plate cylinder. Thin-walled portions 6*a* at the two ends of the lockup device 6 are fitted to be slightly circumferentially movable while their vertical movement is restricted by the left and right guides 3 and 4. An intermediate portion of the lockup table 6 is slidably pressed by a plurality of guides (not shown) fixed on the bottom surface of the gap 2, so that floating of the lockup table 6 is prevented. A plurality of screw holes 6*b* are formed in portions along the longitudinal direction of the lockup table 6 and each has a section shown in FIG. 4. An adjusting screw 7 whose distal end is tapered is threadably engaged with a corresponding one of the screw holes 6*b*. A collared pin 8, the collar portion of which is fitted between the lockup table 6 and the gap 2, is slidably inserted in each pin hole corresponding to each of the adjusting screws 7. The distal end of the collared pin 8 abuts against a tapered surface of the corresponding adjusting screw 7. With this arrangement, when the adjusting screw 7 is turned, the lockup table 6 is slightly moved in the circumferential direction by the behavior of the tapered surface. A compression coil spring 9 in FIG. 5 is inserted between a stud 10 on the lockup table 6 and the wall surface of a recessed hole 2*a* of the gap 2 to bias the lockup device 5 outward.

Figure 5:
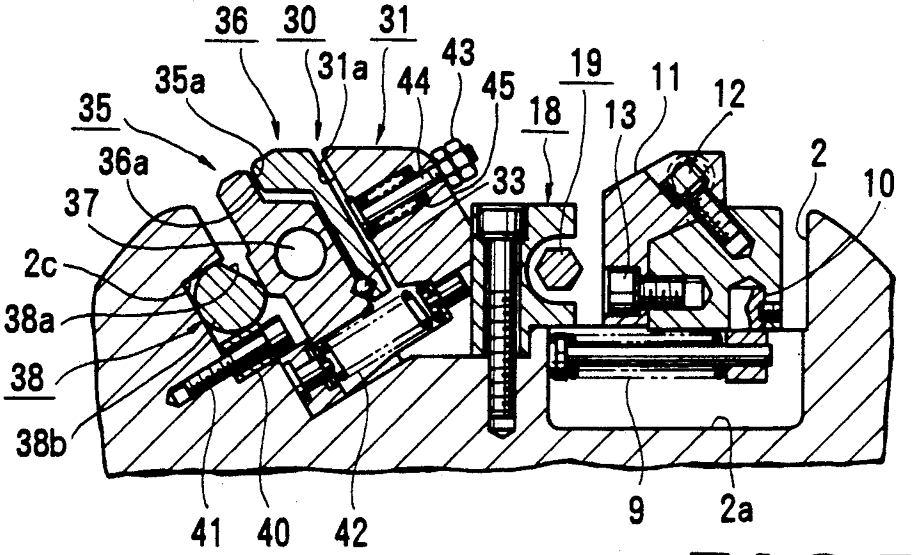
Figure 6:
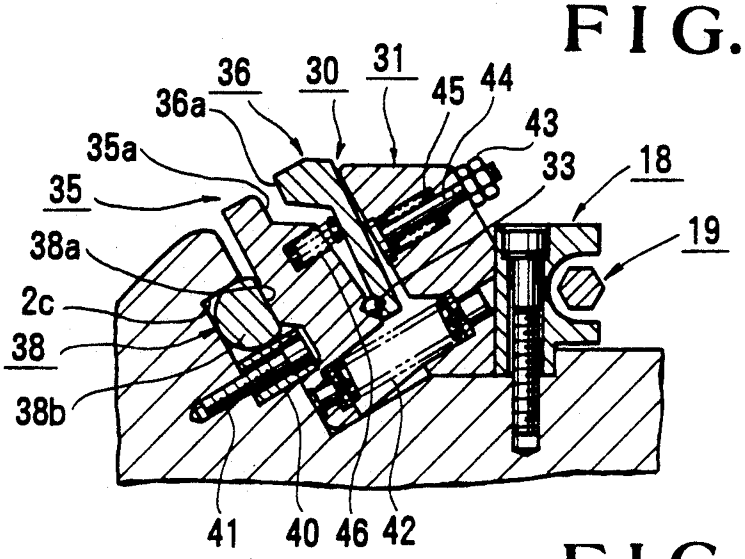

An L-shaped leading-side plate holder 11 shown in FIG. 5 is fixed by bolts 12 and 13 on the inclined surface of the lockup table 6. Three gripper plates 14 having a substantially V-shaped section, divided in the axial direction of the plate cylinder, and constituting the same overall length as that of the lockup table 6 are swingably supported on pins 11*a* horizontally extending from the plate holders 11. A gripper surface 14*a* of each gripper plate 14 opposes the gripper surface of the lockup table 6. Although not shown, a plurality of projections are formed on the gripper surface 14*a* and are engaged with the recesses formed in the opposite gripper surface. A plurality of studs 15 each having a sectional shape shown in FIG. 2 extend upward from the bottom surface of the lockup table 6 and are aligned in the axial direction of the plate cylinder to extend into the recessed hole 2*a* of the gap 2. A compression coil spring 17 is inserted between a spring reception pin 16 threadably engaged with a screw hole of each stud 15 and the gripper plate 14 to bias the gripper plate 14 in a direction so that the gripper surface 14*a* of the gripper plate 14 is closed.

A plurality of bearings 18 having a rectangular parallelepiped shape are fixed by bolts at the central part of the bottom surface of the gap 2 and are aligned along the axial direction of the plate cylinder. A hexagonal cam shaft 19 is fitted in the bearings 18. A plurality of plate gripper cams 20 each having large- and small-diameter portions are mounted on the cam shaft 19 in tandem with each other. The cam surface of each plate gripper cam 20 is in contact with a vertical surface of the corresponding gripper plate 14. Upon driving of the cam shaft 19 by a drive unit (to be described later), the large-diameter portions of the plate gripper cams 20 cause the gripper plates 14 to pivot in the counterclockwise direction against the biasing forces of the compression coil springs 17, so that the gripper surfaces 14*a* are opened.

A trailing-side plate lockup device 30 is arranged parallel to the leading-side lockup device 5 within the gap 2. The trailing-end lockup device 30 comprises a spring reception bar 31 having almost the same length as the overall length of the plate cylinder and a vertical surface which is in contact with the vertical surface of the corresponding bearing 18. The spring reception bar 31 is fixed on the bottom surface of the gap 2 by a plurality of bolts 32. The spring reception bar 31 comprises a regulation surface 31*a*extending in the radial direction of the plate cylinder 1. A support shaft 33 extends between the regulation surface 31*a* and a wall surface 2*b* of the gap 2 so that the two ends of the support shaft 33 are located near disc bearers 34 at the two ends of the plate cylinder 1. Three separated lockup tables 35 and three separating gripper plates 36 have opposite gripper surfaces 35*a* and 36*a* extending in the radial direction of the plate cylinder 1 so that ends of the lockup tables 35 and the gripper plates 36 opposite to these gripper portions are swingably connected to each other through the support shaft 33. Reference numerals 37 denote adjusting screws for connecting the three separated lockup tables 35. Right- and left-hand threads are threadably engaged with screw holes of each lockup table 35. A tool is inserted into a hole of a collar portion 37*a* integrally formed between the two adjacent lockup tables 35 and is turned to adjust a distance between the adjacent lockup tables 35.

A rod-like cam 38 formed by a planar small-diameter portion 38*a* and an arcuated large-diameter portion 38*b* is pivotally mounted on the bearer 34 in a recessed portion 2*c* formed in the wall surface 2*b* of the gap 2. An extended portion 38*c* of the cam 38 from the bearer 34 has a hexagonal shape. Reference numeral 40 denotes a guide for pivoting the cam 38 and is fixed in the recessed portion 2*c* of the wall surface 2*b* by a bolt 41. Compression coil springs 42 are interposed between a plurality of spring hole bottom surfaces formed in the non-gripper ends of the lockup tables 35 and the plurality of spring hole bottom surfaces formed in the spring reception bar 31 to separate the lockup tables 35 from the spring reception bar 31. A compression coil spring 45 is interposed between the bottom surface of a spring hole 31*b* and a collar portion of a spring shaft 44 whose movement is limited by a double nut 43 slidably mounted in the spring hole 31*b* of the upper portion of the spring reception bar 31, and separates each gripper plate 36 from the spring reception bar 31. A compression coil spring 46 is arranged within the spring hole of the upper portion of each lockup table 35 to bias this lockup table 35 from the corresponding gripper plate 36. Reference numeral 47 denotes a blanket cylinder which is brought into rolling contact with the plate cylinder 1.

A plate lockup opening/closing unit for pivoting the cam shaft 19 and the cam 38 to open/close each plate gripper surface will be described below. Each plate lockup opening/closing unit is arranged near each of right and left frames 50 for supporting the plate cylinder 1 and the blanket cylinder 47. The right drive unit (the left-hand unit in FIG. 1 for illustrative convenience) on the right frame 50 when viewed from the sheet feeder will be described first. An air cylinder 51 serving as a drive unit is swingably supported on the upper end face of the frame 50 through a bracket 52. Levers 53 and 54 are split-fixed on the leading-side cam shaft 19 and the trailing side cam 38 between the bearer 34 and the frame 50. A link mechanism 55 is arranged between the air cylinder 51 and the levers 53 and 54. The distal end portion of a rod 57 connected to a piston rod 56 of the air cylinder 51 is connected to a free end portion of an L-shaped lever 59 pivotally supported on the upper surface of the frame 50 through a bracket 58. The lower end portion of a rod 60 whose upper end is connected to the other free end portion of the L-shaped lever 59 is connected to a free end portion of a lever 62 supported on a stud 61 of the frame 50. A lever 63 is formed integrally with the lever 62. A free end portion of the lever 63 is connected to one end of a roller lever 64. Reference numeral 65 denotes a lever shaft pivotally supported between the right and left frames so that axial movement of a lever 66 pivotally mounted thereon is limited. A free end portion of the lever 66 is supported by the central portion of the roller lever 64. That is, a four-joint link is constituted by the levers 63 and 66 and the roller lever 64. When the lever 62 is driven by the air cylinder 51 and is swung, the roller lever 64 is reciprocated together with the levers 63 and 66 in the radial direction of the plate cylinder 1. A roller 67 which is selectively brought into contact with the lever 53 or 54 in accordance with a pivotal phase of the plate cylinder 1 is mounted on the distal end portion of the roller lever 64. When the roller lever 64 is reciprocated, the lever 53 or 54 is pivoted about the cam shaft 19 or the cam 38 within the range between the solid line and the alternate long and short dashed line in FIG. 7. In the right opening/closing unit, when the lever 53 is located at the position indicated by the solid line, the plate gripper surfaces of the leading-side lockup device 5 are opened. However, when the lever 54 is located at the position indicated by the solid line, the plate gripper surfaces of the trailing-side lockup device 30 are closed.

Figure 7:
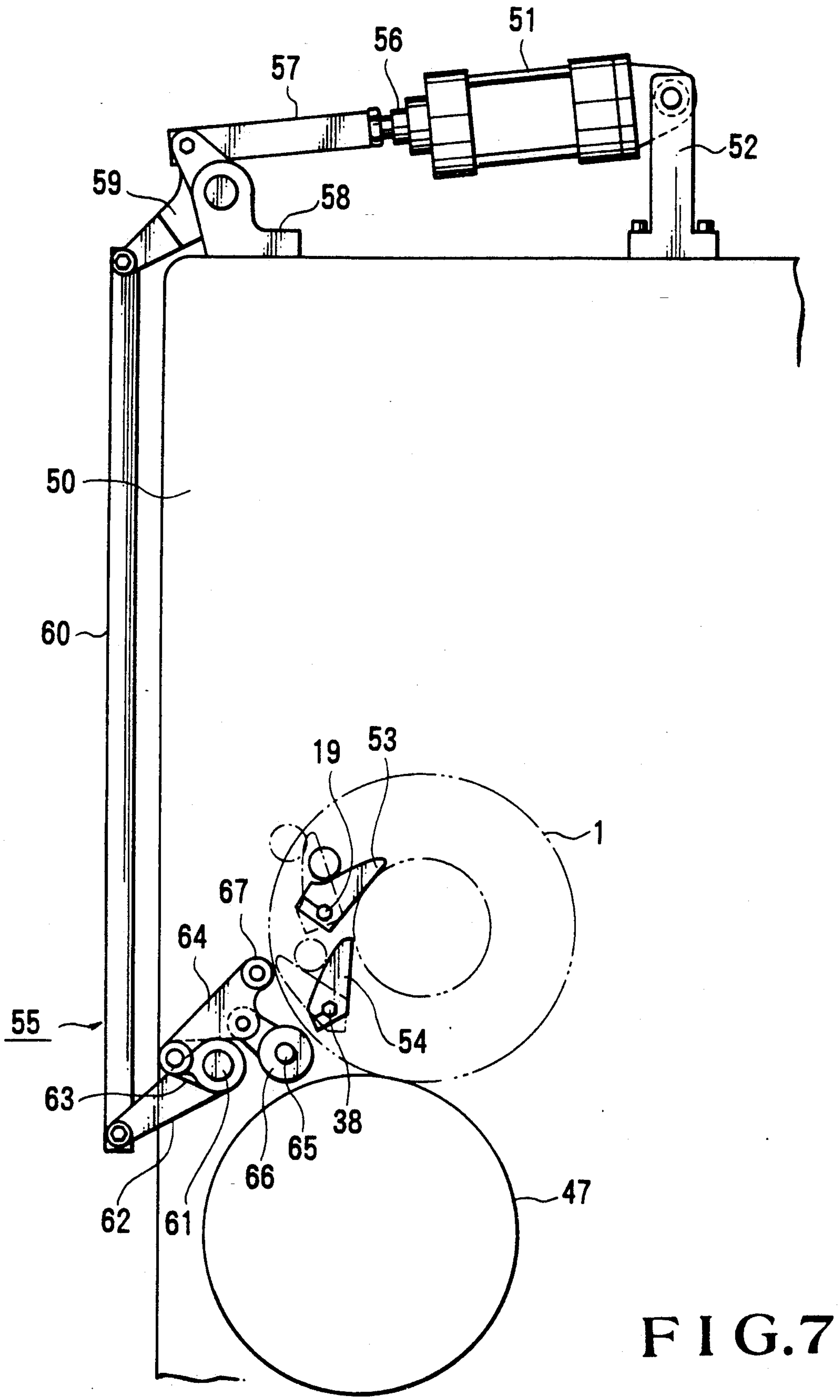
Figure 8:
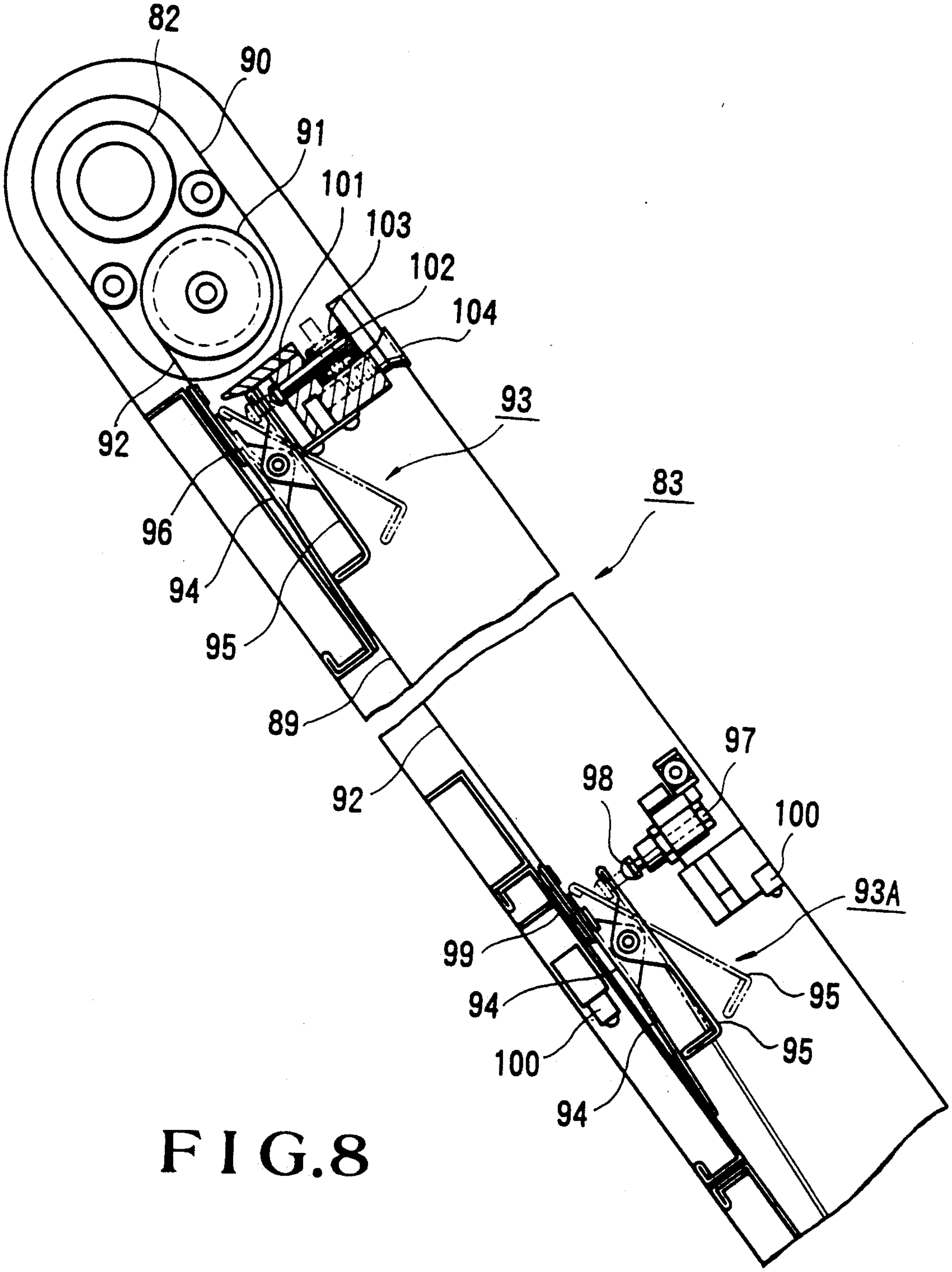
Figure 13:
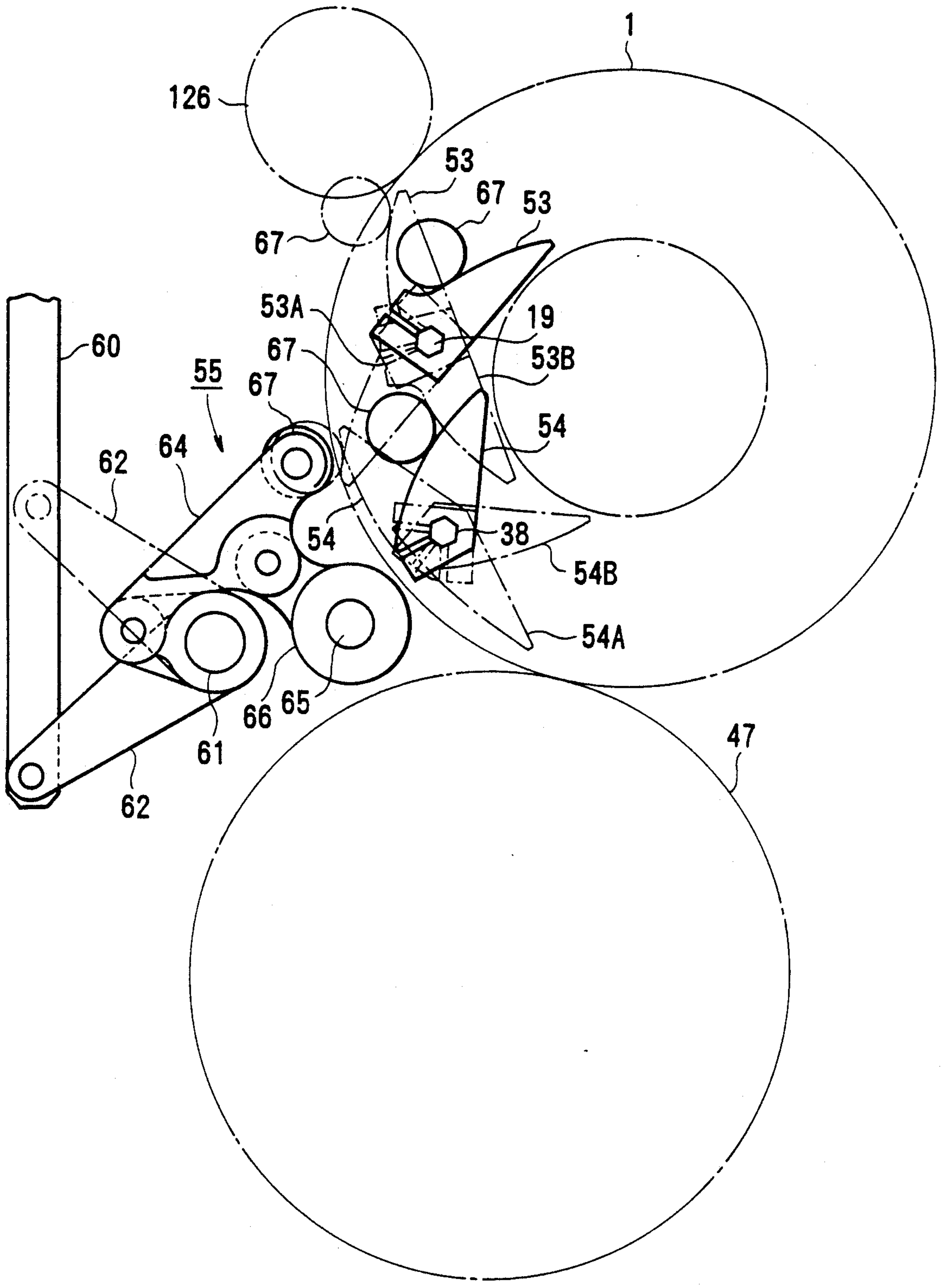

The left plate lockup opening/closing unit (the right drive unit in FIG. 1) on the left frame side when viewed from the sheet feeder is arranged similarly to the right opening/closing unit, although the left opening/closing unit is not illustrated in FIG. 7. The arrangement of the left opening/closing unit is the same as that of the right opening/closing unit as far as the components from the air cylinder 51 to the roller 67 are concerned. The arrangement of the left opening/closing unit is different from that of the right opening/closing unit in levers 53 and 54. That is, as shown in FIGS. 1, 7, and 13, the right levers 53 and 54 extend upward from the cam shaft 19 and the cam 38. However, in the left opening/closing unit, levers 53A and 54A in FIGS. 1 and 13 extend downward from the cam shaft 19 and the cam 38. That is, the distal end portion of the right trailing-side lever 54 and the distal end portion of the left leading-side lever 53A are in phase in the circumferential direction and oppose the rollers 67. With this arrangement, when the right and left air cylinders 51 are simultaneously actuated, the lever 54 is pressed by the right roller 67 to open the plate gripper surfaces of the trailing-side plate lockup device 30. At the same time, the left lever 53A is pressed by the left roller 67 and is moved to the position represented by reference numeral 53B. The right lever 53 is moved to the position indicated by the alternate long and short dashed line, so that the plate gripper surfaces of the leading-side plate lockup device 5 are opened. Since directions of the distal ends of the right lever 53 and the left lever 53A are opposite to each other, when the right lever 53 is moved from the position of the alternate long and short dashed line to the position of the solid line, the left lever 53A is moved from the position represented by reference numeral 53B to the position represented by reference numeral 53A, as shown in FIG. 13. When the left lever 54A is moved from the position represented by reference numeral 54A to the position represented by reference numeral 54B, the right lever 54 is moved from the position of the solid line to the position of the alternate long and short dashed line.

Figure 11:
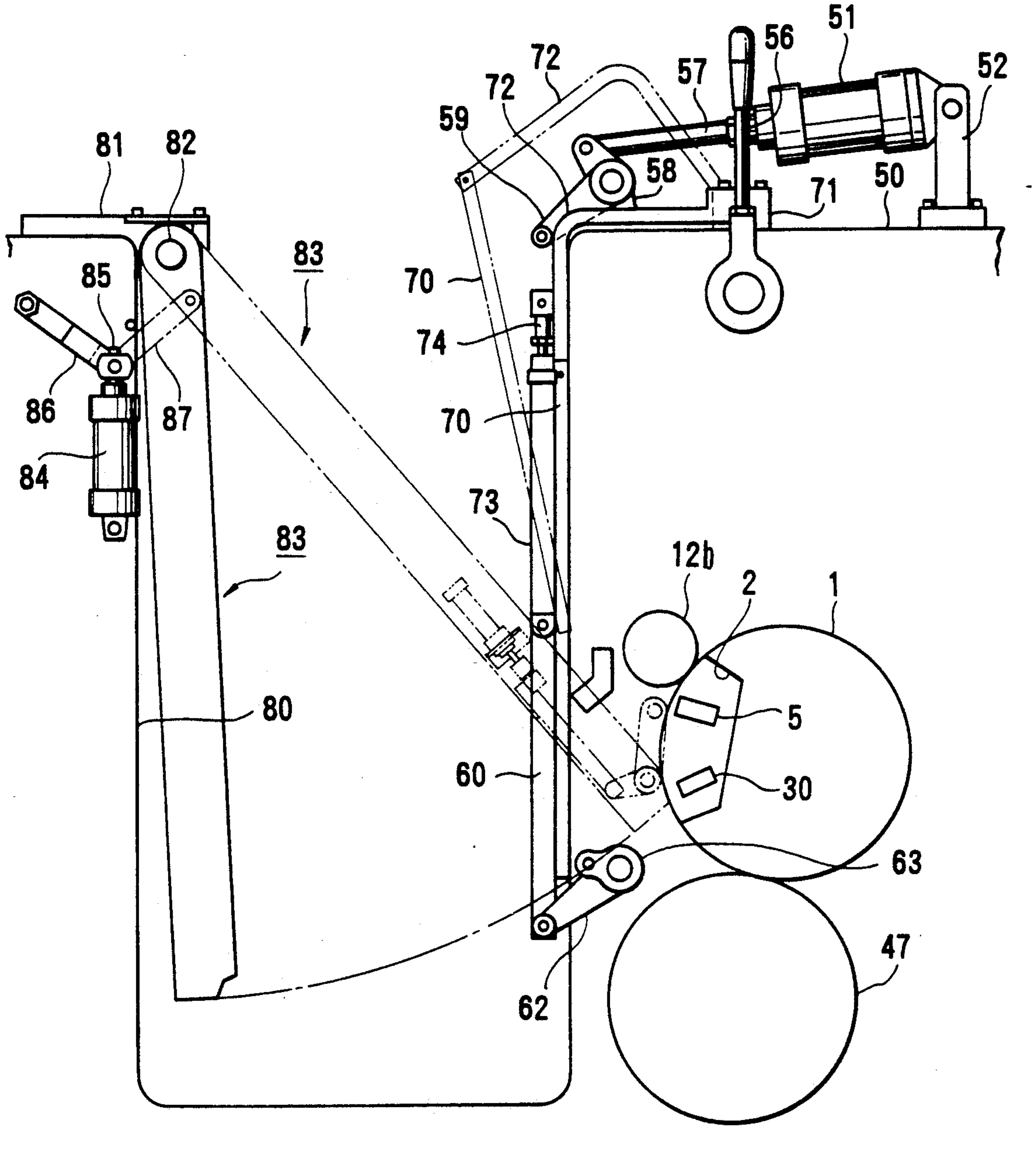

Reference numeral 70 in FIG. 11 denotes a cover for covering the front side of the plate cylinder 1 throughout its entire length. The cover 70 is pivotally supported on a free end portion of an L-shaped lever 72 pivotally supported on the upper end surface of the frame 50 through a bracket 71. An actuation end of a piston rod 74 of an air cylinder 73 pivotally supported on the frame 50 is mounted on the L-shaped lever 72. With this arrangement, when the air cylinder 73 is actuated in response to a command from a control unit, the cover 71 is moved in the range of the position indicated by the solid line and the position indicated by the alternate long and short dashed line.

A plate replacing apparatus for replacing an old plate with a new plate is arranged in the plate lockup apparatus and the opening/closing unit. That is, a pair of right and left brackets 81 are located obliquely above the plate cylinder 1 and are mounted on the upper ends of the rear sides of right and left frames 80 mounted in a printing unit in front of the frames 50. The proximal end of a loader 83 serving as a plate holding member having a rectangular member whose long sides are aligned in the horizontal direction and having almost the same length as the plate cylinder is mounted on a support shaft 82 pivotally mounted on these brackets 81. An air cylinder 84 connected to the control unit is pivotally supported on the right and left frames 80 near the brackets 81. A lever 86 supported by the frame 80 and a lever 87 supported on the loader 83 are connected to an actuation end of a piston rod 85 of the air cylinder 84. With this arrangement, when the piston rod 85 of the air cylinder 84 is reciprocated, the loader 83 is swung through the levers 86 and 87 between a suspended position indicated by the solid line and an inclined position indicated by the alternate long and short dashed line, so that the distal end portion of the loader 83 comes close to or is separated from the circumferential surface of the plate cylinder 1.

Figure 9:
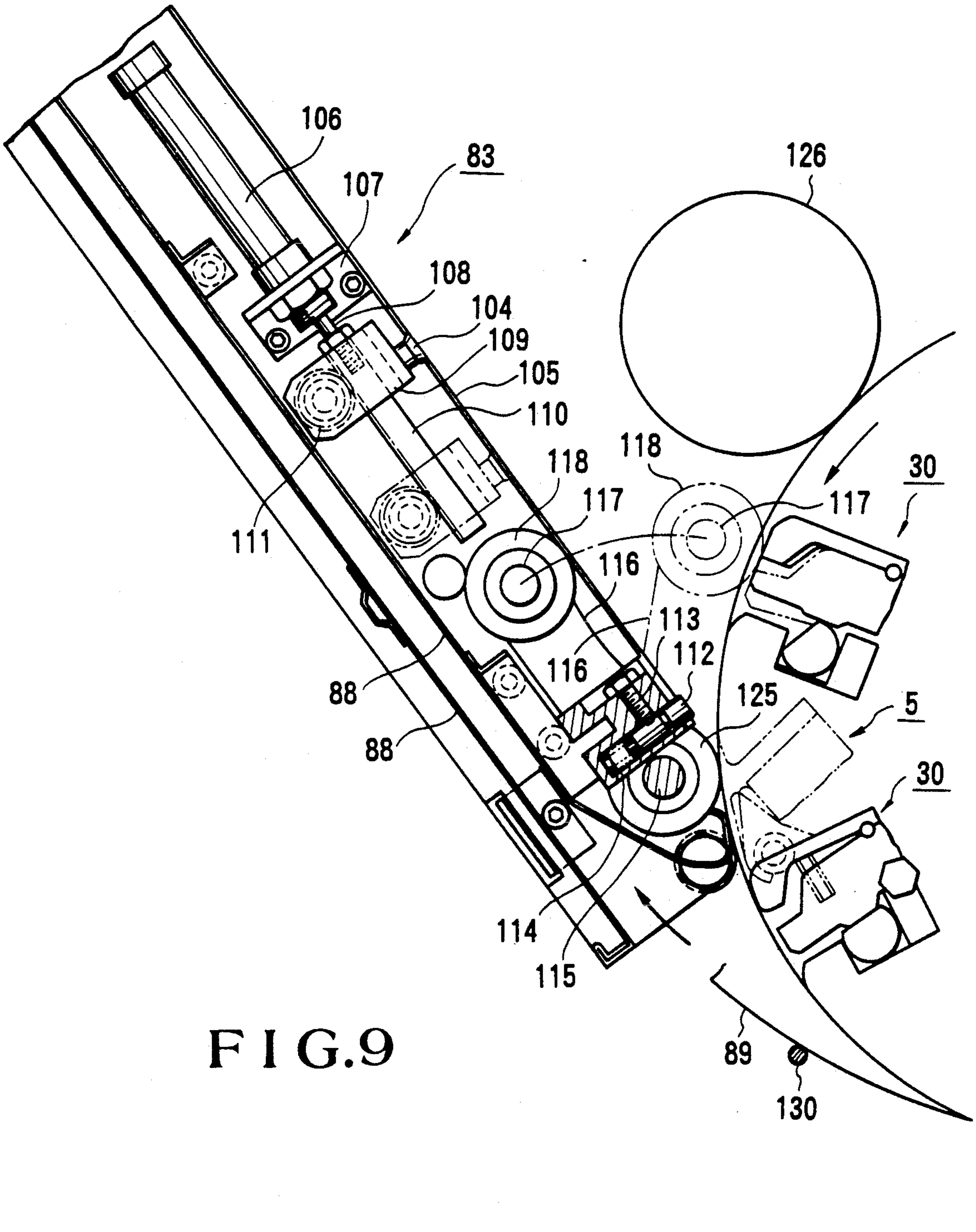
Figure 10:
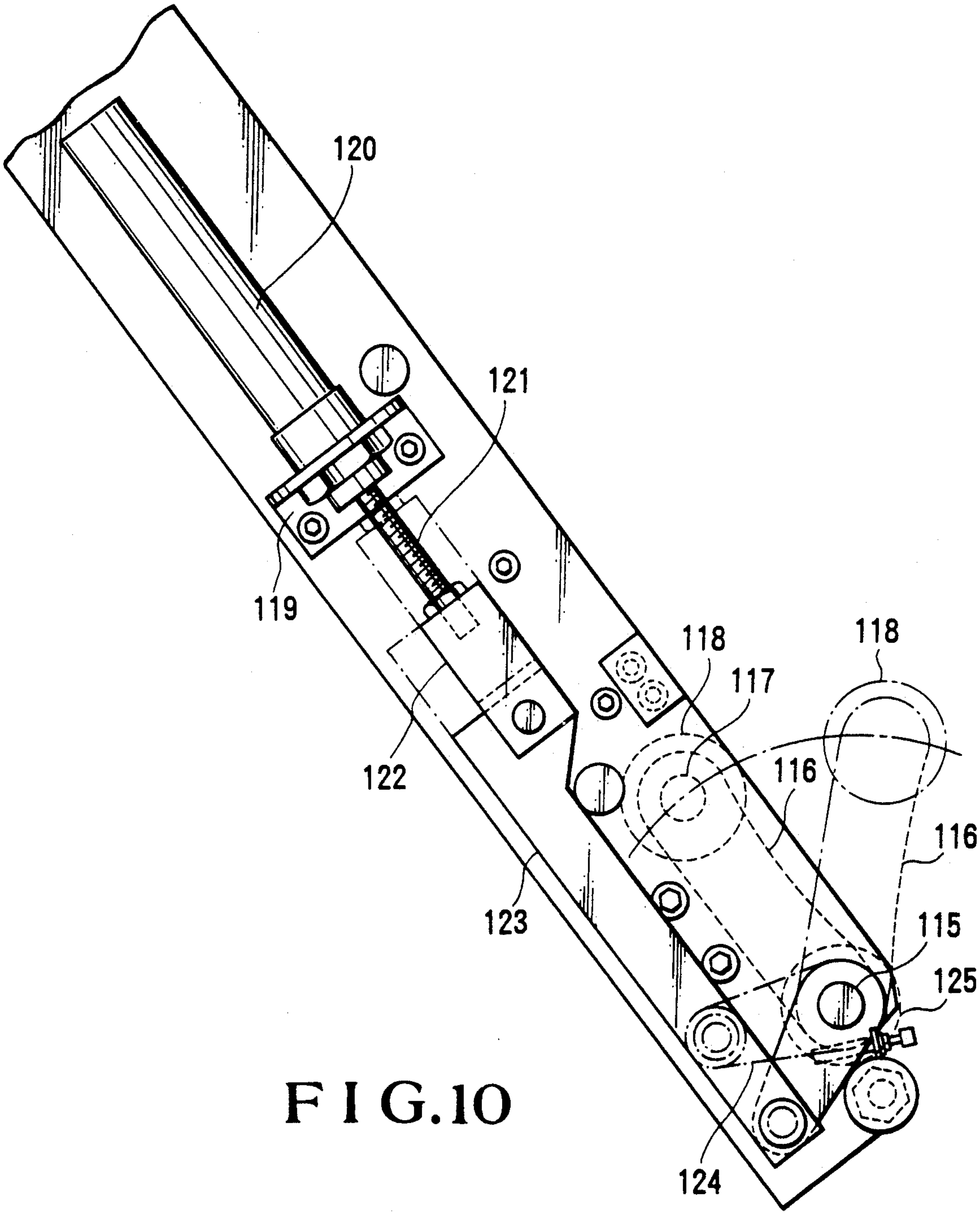

As shown in FIG. 9, two guide plates 88 having a V-shaped inlet vertically extend in the lower half of the loader 83. When the plate lockup device 30 is opened, a plate 89 released and rewound upon pivotal movement of the plate cylinder 1 is inserted between the guide plates 88 in a direction indicated by an arrow.

An old plate gripper unit arranged in the loader 83 will be described below. A plurality of pairs of brackets 90 each having an oval shape are fixed on the tubular support shaft 82 in the upper end portion of the loader 83 at positions obtained by dividing the overall width of the loader 83 into ⅓. Convex members 91 are supported on the respective pairs of brackets 90. Each convex member 91 has a band-like leaf spring 92 biased in a direction to wind the convex 91. The fixed end of the leaf spring 92 is fixed to an old plate gripper unit 93. A support plate 94 fixed to the lower end of the leaf spring 92 is arranged in the old plate gripper unit 93 so as to be reciprocally slidable along the inner wall surface of the loader 83. The central portion of an L-shaped plate hook 95 serving as the old plate gripper member is swingably supported on the support plate 94. The plate hook 95 is biased by a torsion coil spring 96 so as to be set at an upright position (position of the solid line). A bent portion of the plate 89 entering between the guide plates 88 is hooked by a hook portion of the plate hook 95. That is, prior to the start of replacement of the plate 89, the old plate gripper unit 93 is manually moved downward to the central standby position of the loader 83, and a piston rod 98 of an air cylinder 97 arranged at this standby position is moved forward upon depression of a push button. The plate hook 95 is open to be located at the position of the alternate long and short dashed line against the biasing force of the torsion coil spring 96. When the support plate 94 is urged against the inner surface of a cover 99 by the upper end of the plate hook 95, the old plate gripper unit 93 as a whole is prevented from upward movement against the tension of the leaf spring 92. Reference numeral 100 denotes a sensor arranged as a detector near the air cylinder 97 consisting of a light-emitting element and a light-receiving element and located near the air cylinder 97. The sensor 100 detects the leading edge of the plate 89 entering between the guide plates 88, and the piston rod 98 of the air cylinder 97 is moved backward to cause the plate hook 95 to stand in a state indicated by a solid line by the elastic force of the torsion coil spring 96. The bent portion of the plate 89 is hooked by the plate hook 95, and at the same time, locking by the support plate 94 is released, so that the plate trailing edge holding unit 83 as a whole is moved upward together with the plate 89 by the tension of the leaf spring 92. Therefore, the plate 89 is pulled into the loader 83.

A pin 102 is slidably supported in a hole of a block 101 arranged in correspondence with the plate hook 95 at the upper end portion of the loader 83 and is biased in a direction to be removed from the block 101 by a compression coil spring 103. This pin 102 is pushed against the elastic force of the compression coil spring 103 to incline the upper end portion of the plate hook 95 as indicated by the alternate long and short dashed line, thereby releasing the bent portion of the plate 89. Therefore, the plate 89 can be removed from the loader 83.

A plate feed unit will be described below. Upper-, middle- (not shown), and lower-stage suction pads 104 (each stage consists of a plurality of pads) for chucking a new plate 105 to be fed to the plate cylinder 1 in place of the old plate 89 are connected to a suction air source and are arranged on the surface of the loader 83. The lower-stage suction pads 104 are vertically movable. That is, a pair of right and left air cylinders 106 are supported on both side plates of the loader 83 through brackets 107 above the lower-stage suction pads 104. The suction pads 104 are mounted in tandem with each other on a bar 109, both ends of which are fixed to piston rods 108 of the air cylinders 106. When the piston rods 108 are moved forward, the bar 109 which holds the new plate 105 is moved from a position indicated by the solid line to a position indicated by the alternate long and short dashed line, so that the new plate 105 is fed to the leading-side lockup device 5 which is open to the leading edge of the new plate 105. Reference numerals 110 denote racks fixed on the right and left side plates of the loader 83 and meshed with pinions 111 at the two ends of the bar 109 to smoothly move the bar 109 backward. Reference numeral 112 denotes a reference pin slidably fitted in a hole of another bar 113 and biased by a compression coil spring 114 to extend to be fitted in a reference hole of the new plate 105, thereby positioning the new plate 105.

Roller arms 116 are fixed at both side portions of an arm shaft 115 extending from the loader 83 at the lower end portion of the loader 83, while the arm shaft 115 is pivotally supported. A plurality of brush-like rollers 118 constituting a plate press unit together with the arm shaft 115 and the arm 116 are pivotally mounted in tandem with each other on a roller shaft 117 supported between the free end portions of the arms 116. A lever 123 is fixed through a connecting plate 122 to the actuation end of a piston rod 121 of an air cylinder 120 fixed to one widthwise end of the loader 83 through a bracket 119. The free end portion of a lever 124 fixed on the arm shaft 115 is mounted on the lower end portion of the lever 123. With this arrangement, when the piston rod 121 of the air cylinder 120 is reciprocated, the arm 116 can be pivoted in the range between a storage position indicated by the solid line in FIG. 9 and an in-operation position indicated by the alternate long and short dashed line. In the in-operation position, the roller 118 is brought into tight contact with the new plate 105 on the plate cylinder 1, and the inner surface of the plate 105 is brought into tight contact with the outer circumferential surface of the plate cylinder 1. At the same time, the bent portion of the trailing edge of the new plate 105 is inserted into the open trailing-side lockup device 30. A plurality of brush-like rollers 125 are arranged in tandem with each other on the arm shaft 115 and are brought into slidable contact with the new plate 105 so as to guide it to the plate lockup device 5. Reference numerals 126 denote form rollers (generally at least four rollers) of an inking apparatus brought into contact with the plate surface on the plate cylinder 1 to apply an ink to the plate surface.

Figure 12A:
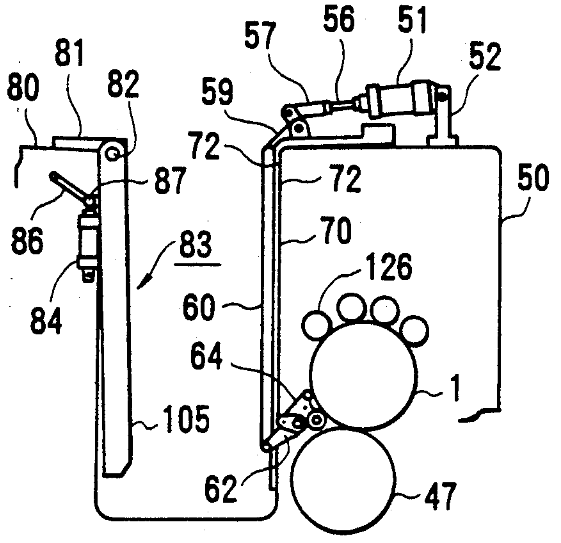
FIGS. 12A to 12H are side views showing plate replacing states of the plate replacing apparatus.
Figure 12B:
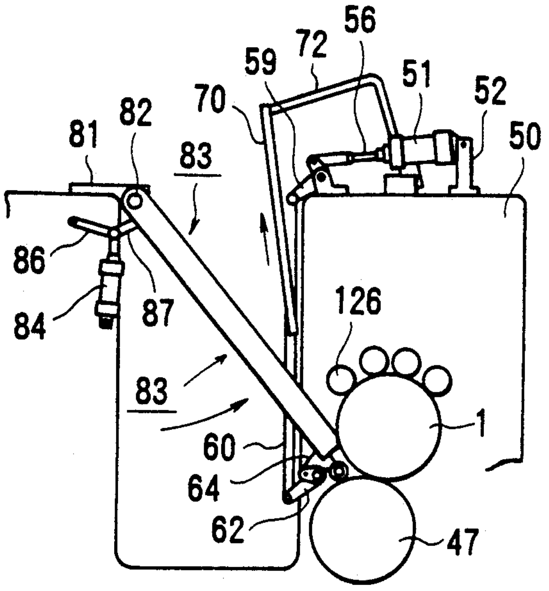

An operation of the plate replacing apparatus having the above arrangement will be described below. During printing, as shown in FIG. 12A, the loader 83 is suspended from the support shaft 82. In this state, the new plate 105 is chucked by the upper-, middle-, and lower-stage suction pads 104, and the reference pin 112 is fitted in the reference hole, so that the new plate 105 is positioned and mounted in the loader 83. The old plate gripper unit 93 in the loader 83 is manually moved downward. When the air cylinder 97 is operated with the push button, the piston rod 98 is moved forward to urge the plate hook 95. The plate hook 95 is inclined as indicated by the alternate long and short dashed line in FIG. 8 and is thus opened.

When printing is completed and the old plate 89 is to be replaced with the new plate 105, a start button is depressed. The air cylinder 73 is actuated to open the cover 70 through the L-shaped lever 72, as indicated by the alternate long and short dashed line in FIG. 11. At the same time, the air cylinder 84 is actuated to incline the loader 83 to a plate replacement position of FIG. 12B, through the levers 86 and 87. The servo motor is rotated predetermined angle so that the plate cylinder 1 is pivoted to the plate removal position. At this time, when the right and left air cylinders 51 are simultaneously operated, the lever 54 is urged by the right roller 67 to open the plate gripper surfaces of the trailing-side plate lockup device 30. At the same time, the left lever 53A is urged by the left roller and is moved to the position indicated by reference numeral 53B. The right lever 53 is moved from the position of the solid line to the position of the alternate long and short dashed line to open the plate gripper surfaces of the leading-side plate lockup device 5. Since the directions of the distal ends of the right and left levers 53 and 53A are opposite to each other, when the right lever 54 is moved from the position of the alternate long and short dashed line to the position of the solid line, the left lever 54A coaxial with the right lever 54 is moved from the position indicated by reference numeral 54B to the position indicated by reference numeral 54A. When the left lever 53A is moved from the position indicated by reference numeral 53A to the position indicated by reference numeral 53B, the right lever 53 coaxial with the left lever 53A is moved from the position of the solid line to the position of the alternate long and short dashed line. In this manner, the leading- and trailing-side plate lockup devices 5 and 30 are simultaneously opened at the stop position of the plate cylinder 1. At the same time, the levers 53 and 54A return to the positions for closing the plate lockup devices 5 and 30.

Figure 12C:
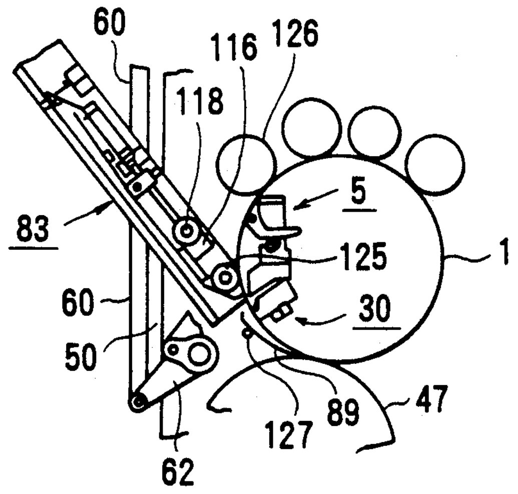
Figure 12D:
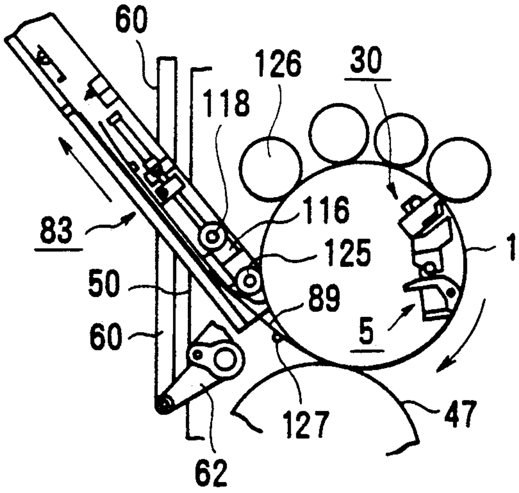

In this state, the trailing edge portion of the old plate 89 is popped up by its rigidity from the trailing-side lockup device 30 and abuts against a guide 130, as shown in FIG. 12C. The plate cylinder 1 is pivoted in a direction opposite to the direction of the arrow in FIG. 9, so that the trailing edge of the old plate 89 is inserted between the guide plates 88 of the loader 83. When the inserted old plate 89 passes through the sensor 100, the sensor 100 detects the plate and drives the air cylinder 97, so that the piston rod 98 is moved backward. The plate hook 95 then stands up, as indicated by the solid line in FIG. 8. As a result, the plate hook 95 hooks the trailing-edge bent portion of the old plate 89, locking of the support plate 94 is released, and the plate trailing-edge holding unit 93 as a whole is moved upward by a tension accumulated by each leaf spring 92 arranged on the corresponding convex member 91. The old plate 89 held on the plate hook 95 is pulled and stored into the loader 83. FIG. 12D shows a state during removal of the old plate 89.

Figure 12E:
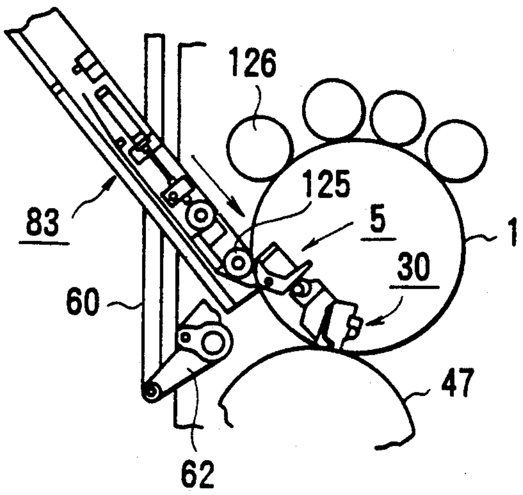
Figure 12F:
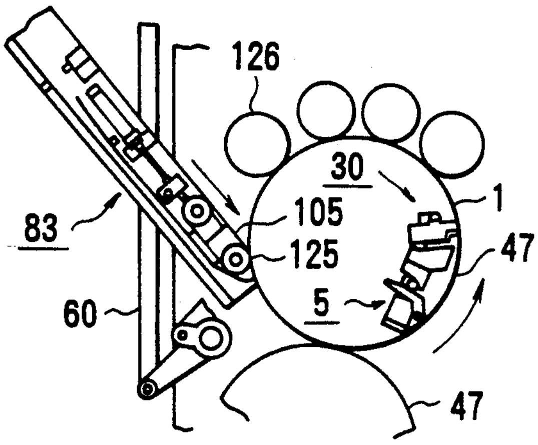

When the plate removal is completed, the servo motor is operated to slightly pivot the plate cylinder 1, and the plate cylinder 1 is stopped so that the open plate gripper surface of the leading-side lockup device 5 reaches a line extended from the new plate 105 and held on the loader 83, as shown in FIG. 9. At the same time, the air cylinder 106 is actuated to rotate the pinions 111 on the racks 110, so that the bar 109 is moved downward. The new plate 105 held by the lower-stage suction pads 104 is guided in slidable contact with the rollers 125. The leading edge of the new plate 105 is inserted into the leading-side lockup device 5. At this time, the lever 53 shown in FIG. 7 is located at the position of the alternate long and short dashed line and opposes the roller 67. When the air cylinder 51 is actuated, the cam shaft 19 is rotated together with the lever 53 to close the leading-side lockup device 5, and the new plate 105 is gripped by the leading-side lockup device 5. This state is shown in FIG. 12E.

Figure 12G:
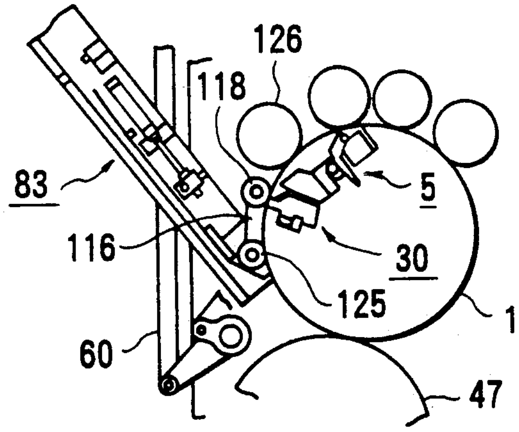

When the servo motor is operated in this state to pivot the plate cylinder 1 in the direction of the arrow, the new plate 105 is wound around the circumferential surface of the plate cylinder 1, and the trailing edge of the new plate 105 is stopped at a position corresponding to the roller 118. Thereafter, the air cylinder 120 is actuated to move the piston rod 121 backward. The arm 116 is pivoted through the levers 123 and 124, and the brush-like rollers 118 are brought into tight contact with the circumferential surface of the plate cylinder 1, thereby inserting the trailing-edge bent portion of the new plate 105 into the trailing-side lockup device 30 by the rollers 118. During rotation of the plate cylinder 1, the rollers 125 are rotated in rolling contact with the surface of the new plate 105. FIG. 12G shows a state after rotation. When the trailing-edge portion of the new plate 105 is inserted into the trailing-side plate lockup device 30, the left air cylinder is operated. In this case, the lever 54A has already been returned to the position indicated by reference numeral 54A. The roller urges the lever 54A upward, and the pivotal movement of the cam 38 causes closing of the trailing-side plate lockup device 30, thereby gripping the inserted end of the new plate 105. At the end of pivotal movement of the cam 38, the gripper plates 36 and the lockup tables 35 become integral with each other and move together in the circumferential direction of the plate cylinder 1. The new plate 105 is thus kept taut and is brought into tight contact with the circumferential surface of the plate cylinder 1.

Figure 12H:
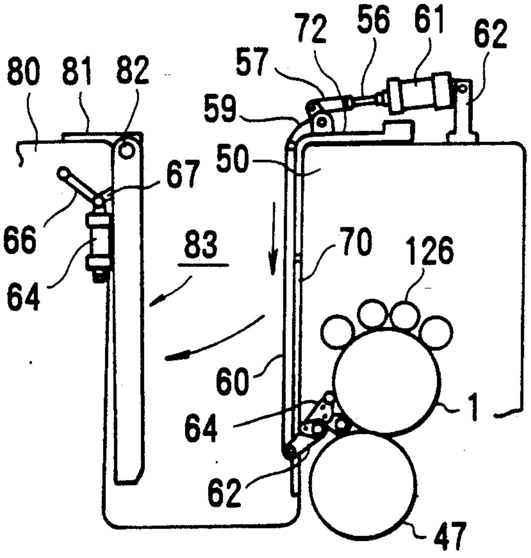

The piston rod 85 of the air cylinder 84 is moved backward to pull the levers 86 and 87. The loader 83 is moved downward to the stored state, as shown in FIG. 12H. The cover 70 is covered upon operation of the air cylinder 73. Therefore, printing can be restarted.

After printing is restarted, when the pin 102 is pushed at the front side of the loader 83 at a proper timing, the plate hook 95 is inclined to release the old plate 89. The old plate 89 is removed from the loader 83. As described above, the new plate 105 can be mounted on the loader 83 to stand by.

An operation of the motor unit will be described below. In normal printing, a piston rod 138 of an air cylinder 136 has been moved to a backward position, and a small gear 151 is kept disengaged from a large gear 132. When a motor in the motor unit is started, a V pulley 131 connected to the motor via a belt is rotated, and an impression cylinder 130 and each portion of the printing press which is connected to the impression cylinder 130 through gears are also rotated. In this case, even if an overload acts on the driven side, the V pulley 131 and the belt slip each other, thus preventing a serious accident.

When plate exchange is to be performed at the end of printing, the air cylinder 136 is operated to move the piston rod 138 forward. A motor base 141 is moved on rails 144 along the direction toward the impression cylinder 130. The small gear 151 is meshed with the large gear 132, and a servo motor 146 is rotated by a predetermined angle in a predetermined direction in accordance with a command from the controller. As described above, since the plate cylinder 1 is stopped at a position where the leading-and trailing-side plate lockup devices 5 and 30 accurately correspond to the distal end of the loader 83, no error such as gripping failure occurs.

Figure 14:
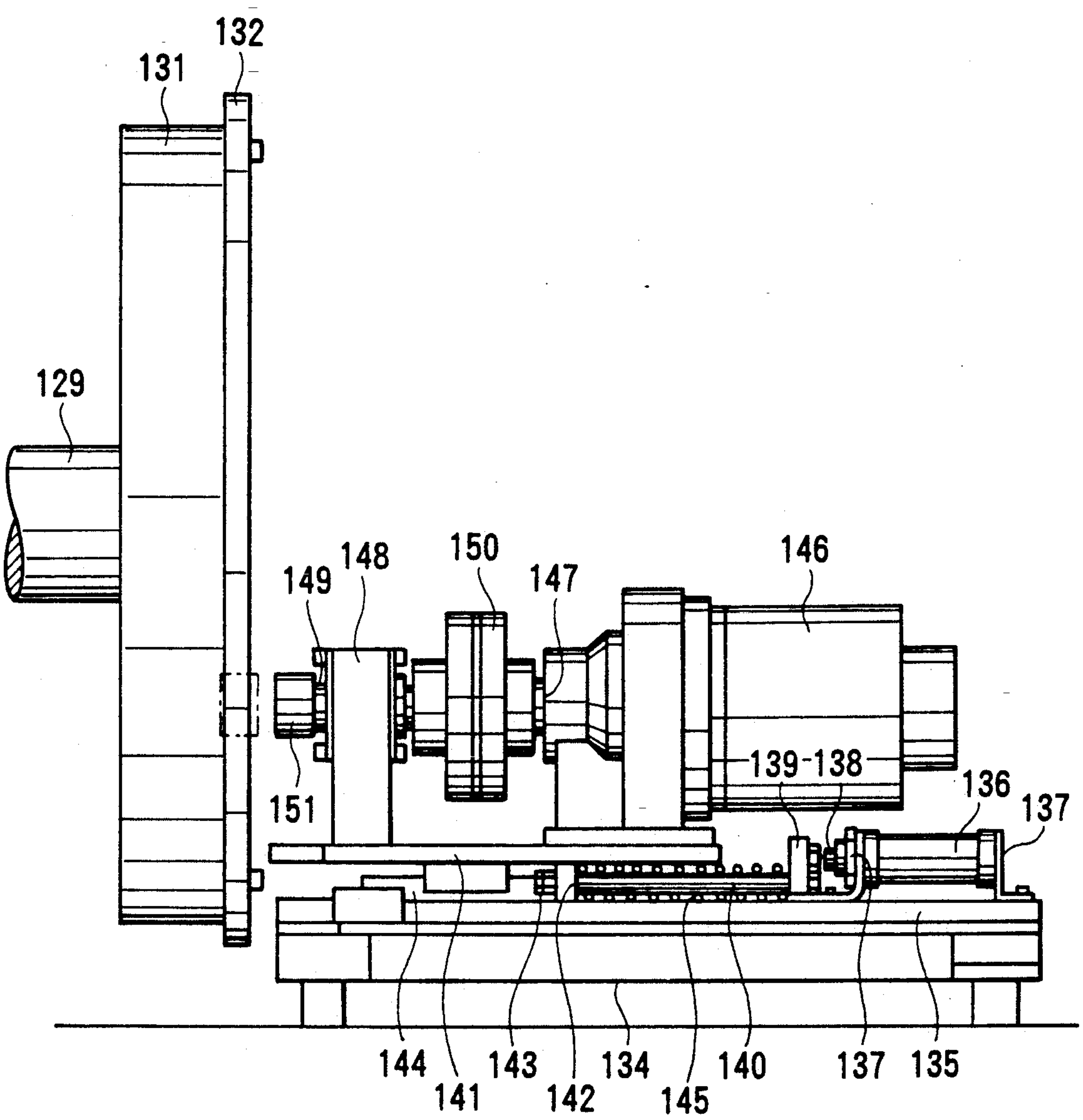
Figure 15:
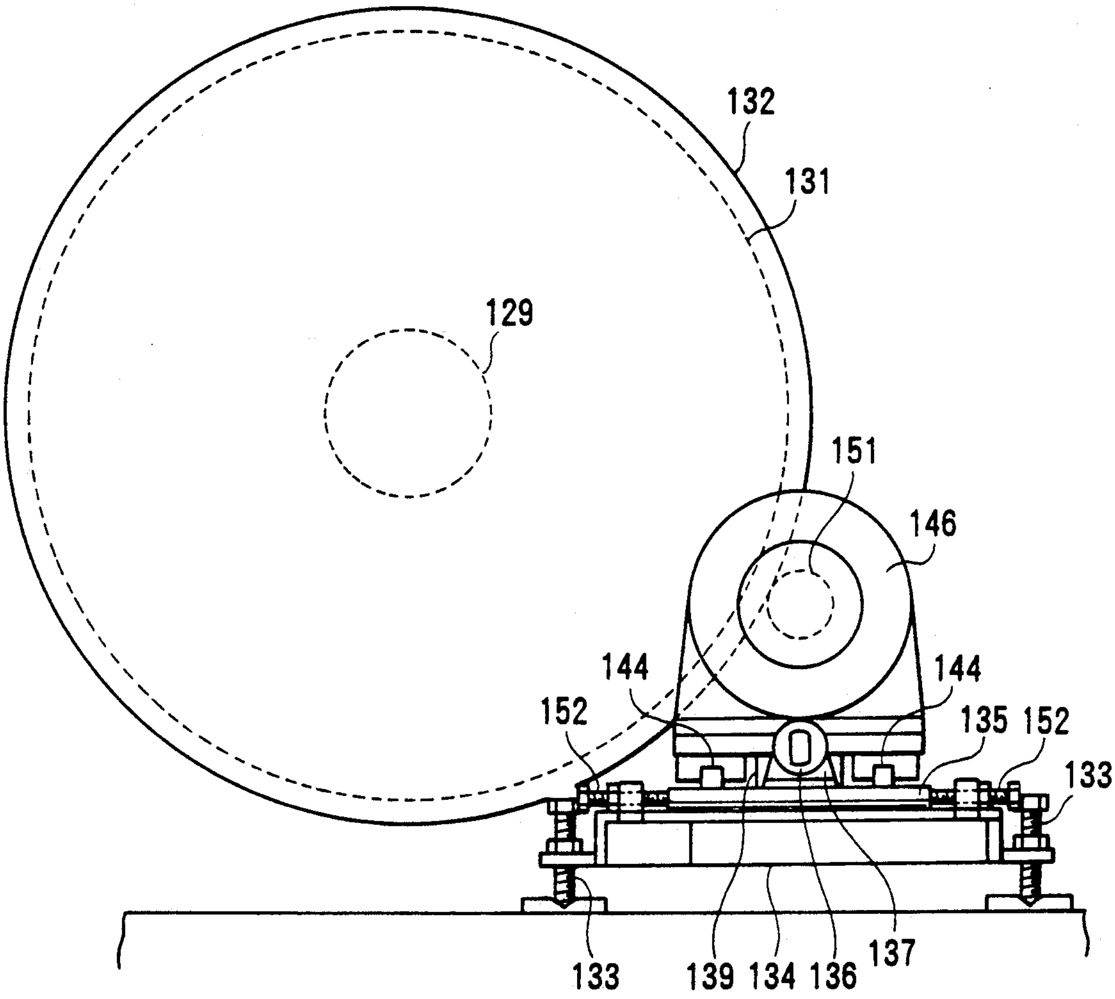

The motor unit according to the present invention will be described in detail. Referring to FIG. 14, reference numeral 129 denotes an end shaft of the impression cylinder which is connected to the plate cylinder 1 through gears. The V pulley 131 operatively connected to the motor side via the belt is mounted on the end shaft 129. The large gear 132 coaxial with the end shaft 129 is bolted to the V pulley 131. A support base 134 is horizontally installed on a floor surface near the impression cylinder and is vertically movably supported by adjusting bolts 133 at four corners of the support base 134. A support frame 135 is mounted on the support base 134 and is supported by adjusting bolts 152 to be movable along a direction perpendicular to the axial direction of the impression cylinder. Reference numeral 136 denotes an air cylinder, front and rear portions of which are supported by brackets 137 in a rear end portion at the center along the direction of width of the support frame 135. A spring retainer plate 139 is fixed to an actuation end of a piston rod 138. The distal end portion of a horizontal spring shaft 140 extending upright on the spring retainer plate 139 is slidably inserted into a leg 142 on the lower surface of the motor base 141 and is fixed by a double nut 143 so as to prevent removal of the distal end from the leg 142. The motor base 141 is supported by the rails 144 on the support frame 135 to be reciprocale along the axial direction of the impression cylinder. A compression coil spring 145 is mounted on the spring shaft 140 between the spring retainer plate 139 and the leg 142, so that the spring retainer plate 139 and the leg 142 are elastically urged in opposite directions.

Reference numeral 146 denotes a servo motor electrically connected to a controller (not shown) and fixed on the motor base 141. A gear shaft 149 supported by a bearing 148 on the motor base 141 is connected to a motor shaft 147 through a coupling 150. The small gear 151 is mounted on the gear shaft 149. With this arrangement, when the piston rod 138 of the air cylinder 136 is reciprocated, the motor base 141 and the servo motor 146 and the like fixed on the motor base 141 are moved in the axial direction of the impression cylinder. The small gear 151 is moved between positions indicated by the solid line and the alternate long and short dashed line (FIG. 14) and is engaged with or disengaged from the large gear 132. Reference numeral 145 denotes a compression coil spring for dampening an impact generated at the time of meshing between the large and small gears 132 and 151.

With the above arrangement, in normal printing, the piston rod 138 of the air cylinder 136 has been moved to the backward position (FIG. 14) and the small gear 151 is kept disengaged from the large gear 132. When the motor is started, the V pulley 131 connected to the motor is rotated, so that the impression cylinder and the respective printing press members connected thereto are rotated. In this case, even if an overload is generated on the driven side, the V pulley 131 and the belt slip relative to each other, thus preventing a serious accident.

When place replacement is performed upon completion of the printing operation, the air cylinder 136 is operated to move the piston rod 138 forward, and the motor base is moved on the rails 144 along the direction toward the impression cylinder. The small gear 151 is engaged with the large gear 132, and the servo motor 146 is pivoted by a predetermined angle in accordance with a command from the controller. As described above, since the plate cylinder 1 is stopped at the position where the leading- and trailing-side plate lockup devices 5 and 30 accurately correspond to the distal end portion of the loader 83, no gripping error occurs.

FIGS. 16 to 21D show a plate replacement method according to the present invention.

Figure 17:
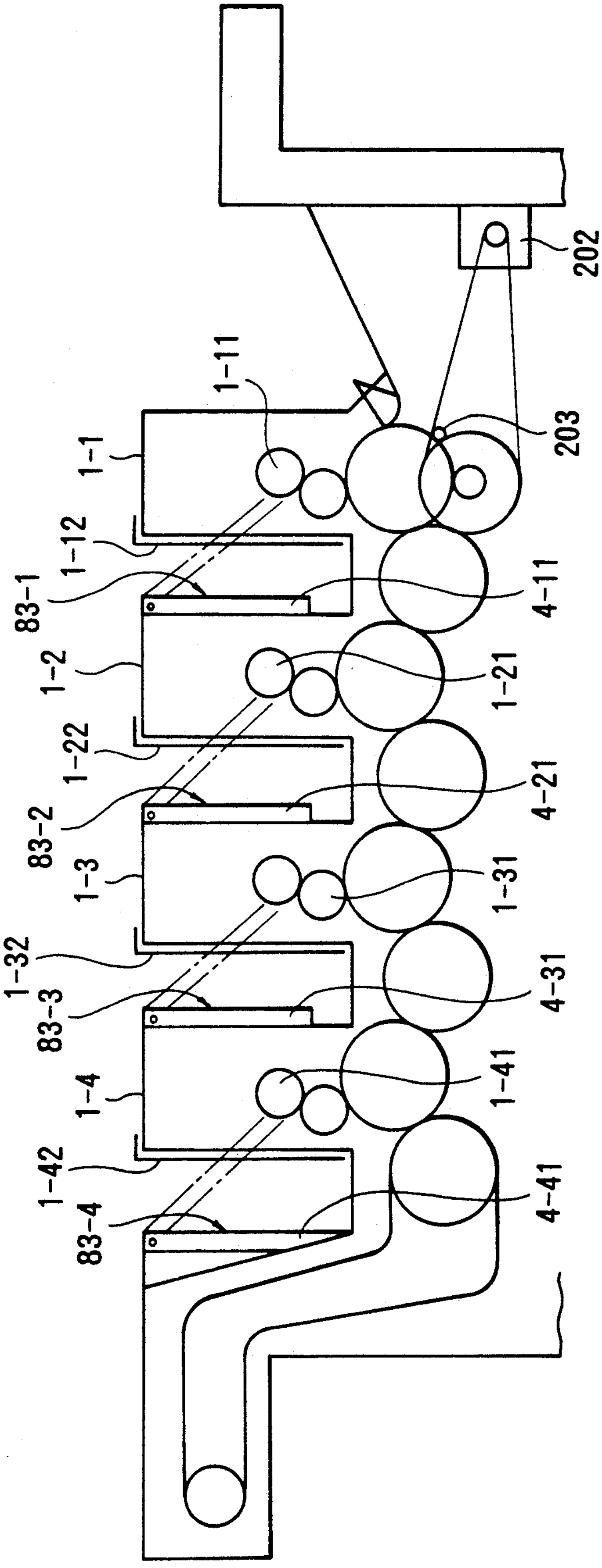

Referring to FIG. 17, reference numeral 1—1 denotes a printing unit of the first color having a plate cylinder 1-11; 1-2, a printing unit of the second color having a plate cylinder 1-21; 1-3, a printing unit of the third color having a plate cylinder 1-31; and 1-4, a printing unit having a plate cylinder 1-41. The plate cylinders 1-11 to 1-41 are synchronously rotated by a motor 202 with a brake mechanism. An absolute type rotary encoder 203 is arranged at a predetermined position of their power transmission system to detect the angular positions of the plate cylinders. Loaders 83-1 to 83-4 of automatic plate replacing apparatuses 4-1 to 4-4 are respectively arranged in the printing units 1—1 to 1-4. At the time of plate replacement, the loaders 83-1 to 83-4 are inclined to the position of the alternate long and short dashed lines by the air cylinders 84, so that their lower end portions face near the circumferential surfaces of the plate cylinders 1-11 to 1-41, respectively. The arrangement and operation of the loaders 83-1 to 83-4 have been described above.

Figure 18:
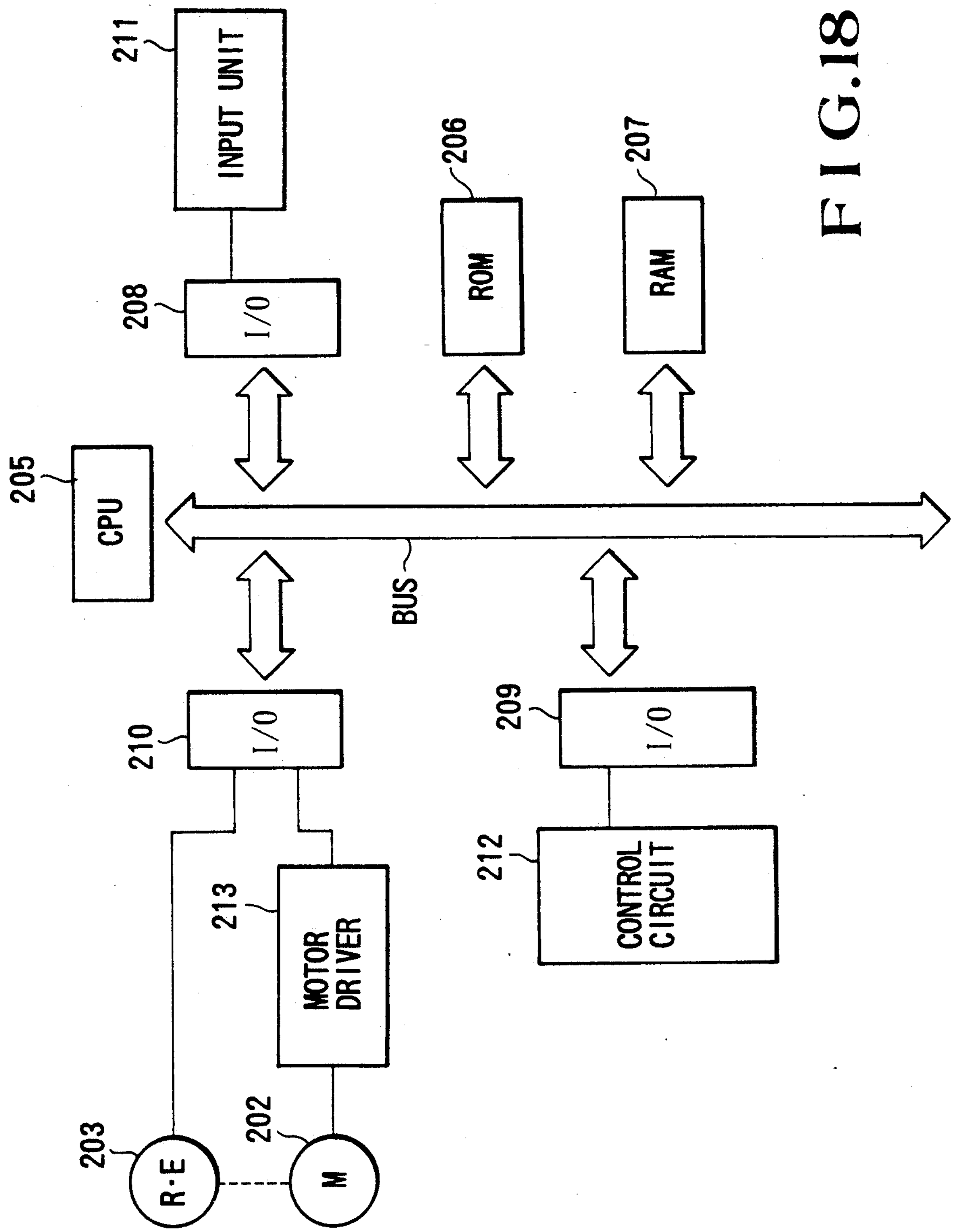

A CPU 205 serving as a controller consisting of a microprocessor shown in FIG. 18 is arranged to control the plate replacing apparatuses. A permanent memory ROM 206, a temporary memory RAM 207, and interfaces 208 to 210 are arranged as peripheral units of the CPU 205 and are connected to each other through a bus BUS. The interface 208 interfaces an input unit 211 and the bus BUS. The interface 209 interfaces a control circuit 212 of the plate replacing apparatus and the bus BUS. The interface 210 supplies a command from the bus BUS to the motor 202 through a motor driver 213 and supplies to the bus BUS an angular position of the plate replacing apparatus which is detected by the rotary encoder 203.

Figure 19A:
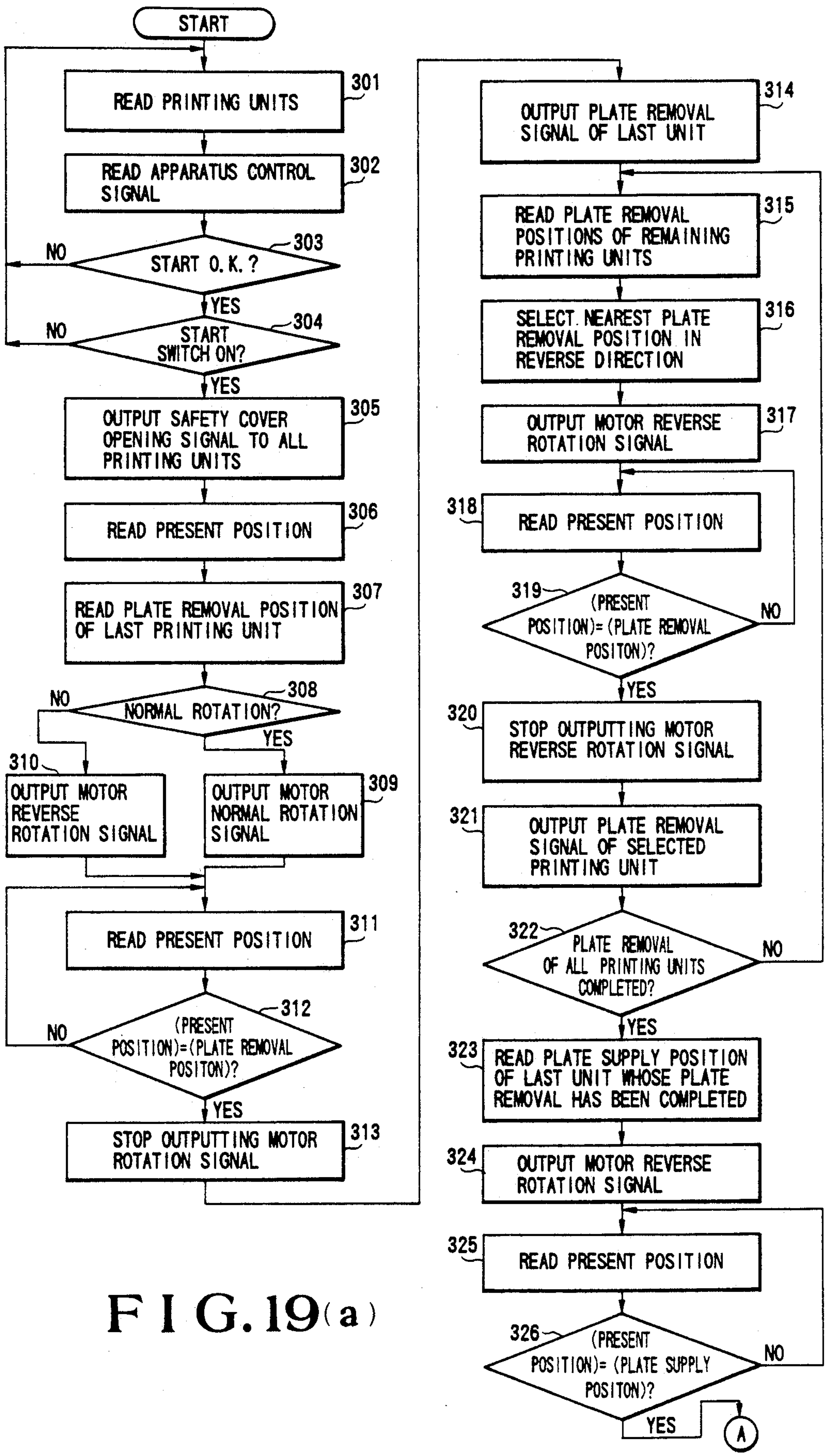
FIGS. 19A and 19B are flow charts showing a control operation of a CPU in the controller.
Figure 19B:
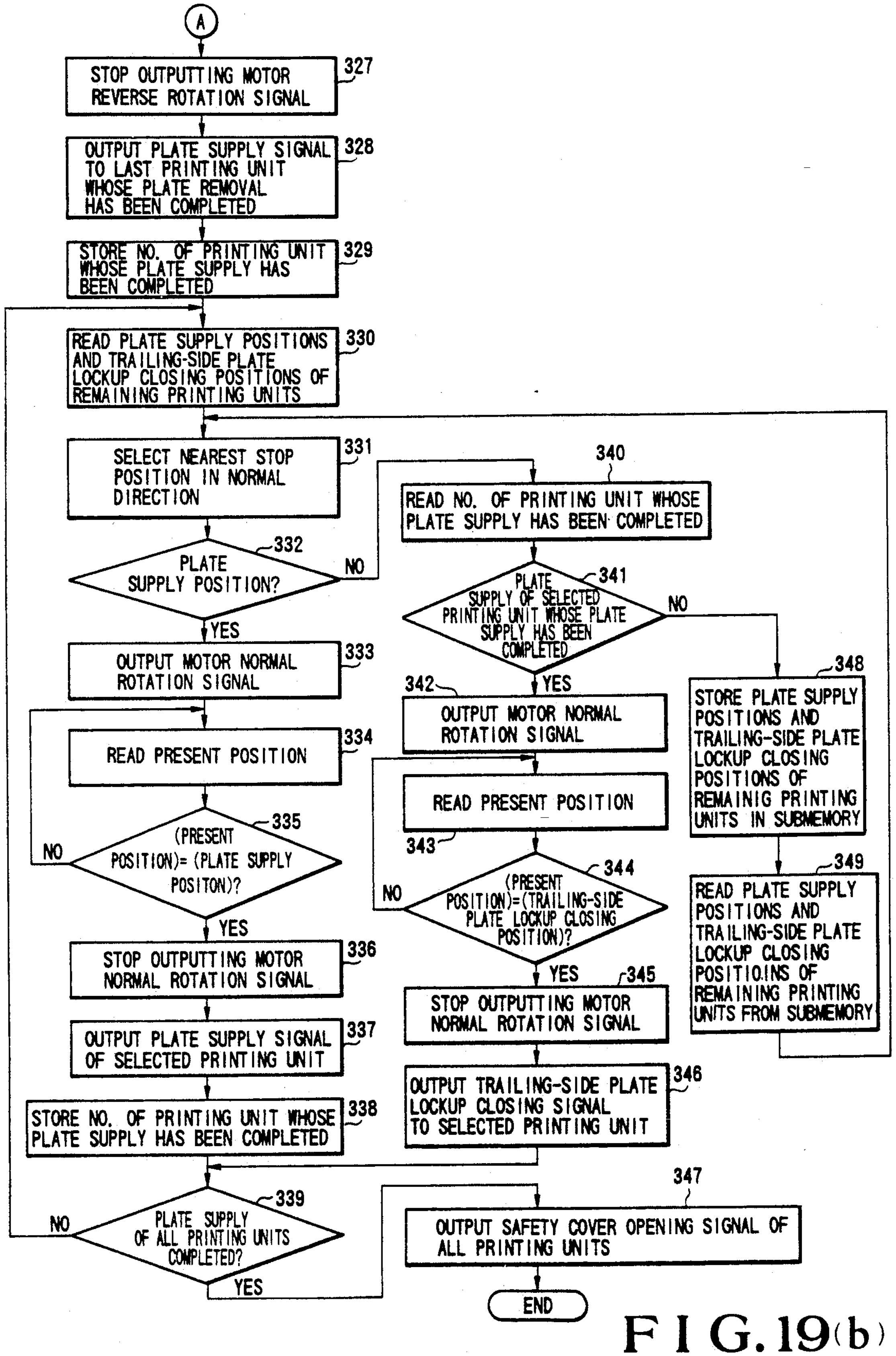

Referring to FIGS. 19A and 19B, the CPU 205 reads a predetermined printing unit, i.e., one of the printing units 1—1 to 1-4 which is subjected to plate replacement, through the input unit 211 (step 301). In this embodiment, all the printing units 1—1 to 1-4 are subjected to plate replacement. The CPU 205 reads an apparatus control signal (step 302) and determines whether the apparatus is stopped and plate replacement is ready (step 303). If YES in step 303, the flow advances to step 304. The CPU 205 determines in step 304 whether a start switch (not shown) is turned on. If YES in step 304, i.e., when the CPU 205 determines that the start switch is turned on, the flow advances to step 305, and automatic plate replacement is started.

Figure 20A:
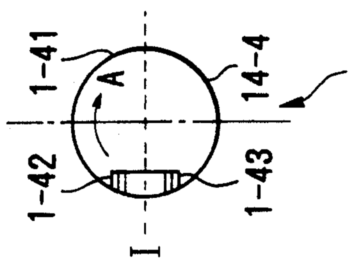
FIGS. 20A to 20D are views for explaining phases of a plate cylinder of the fourth color and plate cylinders of other colors when the printing unit of the fourth color is stopped at the plate removal position.
Figure 20B:
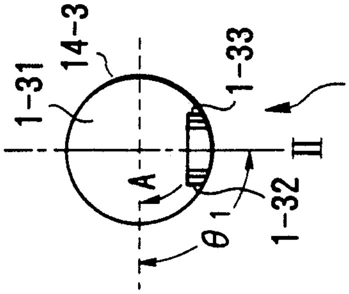
Figure 20C:
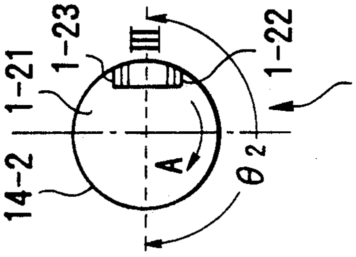
Figure 20D:
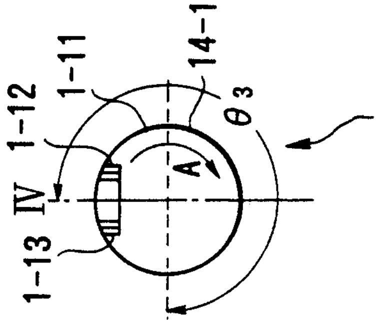

In step 305, a safety cover open signal is output to the control circuit 212 to open safety covers 1-12 to 1-42 attached to the printing units 1—1 to 1-4. The present angular positions of the plate replacing apparatuses which are detected by the rotary encoder 203 are read by the CPU 205 (step 306). The CPU 205 reads a plate removal position of the final printing unit, i.e., the printing unit 1-4 (step 307). In order to set the present position as the plate removal position of the printing unit 1-4, the CPU 205 determines a direction of the shortest angular displacement (step 308). If a determination result represents "forward" rotation, the CPU 205 supplies a forward rotation signal to the motor driver 213. However, if the determination result (step 308) does not represent forward rotation, the CPU 205 supplies a motor reverse rotation signal to the motor driver 213 (step 310). The motor 202 is rotated in the normal or reverse direction in accordance with a signal supplied to the motor driver 213, and the plate cylinders 1-11 to 1-41 are rotated in the normal or reverse direction accordingly. The apparatus angular positions detected by the rotary encoder 203 are sequentially updated. The CPU 205 reads these values as present positions (step 311) and determines whether the present position reaches the plate removal position of the printing unit 1-4 (step 312). If YES in step 312, i.e., the CPU 205 determines that the present position coincides with the plate removal position, the CPU 205 stops outputting the motor rotation signal (step 313), thereby stopping rotation of the motor 202. The plate cylinders 1-11 to 1-41 are synchronously stopped. The plate cylinder 1-41 is stopped at an angular position I serving as the plate removal position, as shown in plate cylinders 1-11 to 1-41 in the printing units 1—1 to 1-4 are different from each other, for example, the plate cylinder 1-31 is stopped at an angular position II angularly spaced apart from the position I by an angle $\theta 1$, as shown in FIG. 20B, the plate cylinder 1-21 is stopped at an angular position III angularly spaced apart from the position I by an angle $\theta 2$, as shown in FIG. 20C, and the plate cylinder 1-11 is stopped at an angular position IV angularly spaced apart from the position I by an angle 03, as shown in FIG. 20D.

The rotational phases of the plate cylinders 1-41 to 1-11 are different from each other, as shown in FIGS. 20A to 20D. The following description will be made on the basis of this assumption.

In this state, the CPU 205 outputs a plate removal signal for instructing plate removal in the printing unit 1-4 (step 314). Upon reception of this plate removal signal, the control circuit 212 sends a loader contact signal to the automatic plate replacing apparatus 4-4 and generates a leading-side plate lockup opening signal and a trailing-side plate lockup opening signal for the plate cylinder 1-41. Upon reception of the loader contact signal, the automatic plate replacing apparatus 4-4 causes its loader 83-4 to incline to the position of the alternate long and short dashed line in FIG. 17. The distal end of the loader 83-4 comes close to the circumferential surface of the plate cylinder 1-41. When the leading-side plate lockup opening signal and the trailing-side plate lockup opening signal are generated, a plate removal operation is started in the printing unit 1-4 (time t1 in FIG. 16A). More specifically, leading- and trailing-side plate lockup devices 1-42 and 1-43 attached to the plate cylinder 1-41 are opened, and the leading- and trailing-edge portions of an old plate 14-4 mounted on the circumferential surface of the plate cylinder 1-41 are set free. The CPU 205 reads plate removal positions of the remaining printing units (step 315), and selects the nearest plate removal position in the reverse direction (step 316). In other words, the plate removal position of a printing unit whose angular position reaches the plate removal position first upon synchronous rotation of the plate cylinders 1-11 to 1-41 in a direction indicated by an arrow A (reverse direction) in FIG. 20A to 20D, that is, the plate removal position of the printing unit 1-3 in this embodiment is selected. The CPU 205 outputs a motor reverse rotation signal (step 317) to rotate the motor 202 in the reverse rotation. Therefore, the plate cylinders 1-11 to 1-41 are synchronously rotated in the reverse direction. During synchronous rotation, the old plate 14-4 located on the circumferential surface of the plate cylinder 1-41 is received by the loader 83-4 of the automatic plate replacing apparatus 4-4 from its trailing edge, and plate removal progresses. During synchronous rotation of the plate cylinders 1-11 to 1-41, the angular positions of the apparatuses which are detected by the rotary encoder 203 are sequentially changed. The CPU reads the angular position of the printing press as the present position (step 318). The CPU 205 determines whether the present position reaches the plate removal position of the printing unit 1-3 selected in step 316 (step 319). If YES in step 319, the CPU 205 stops outputting the motor reverse rotation signal (step 320) to stop rotation of the motor 202. The plate cylinder 1-31 is stopped at the angular position angularly and reversely displaced from the position of FIG. 20B by the angle $\theta 1$, thereby assuming the plate removal position.

In this state, the CPU 205 outputs a plate removal signal for instructing plate removal in the printing unit 1-3 (step 321). Upon reception of this plate removal signal, the control circuit 212 sends a loader contact signal to the automatic plate replacing apparatus 4-3 and generates a leading-side plate lockup opening signal and a trailing-side plate lockup opening signal for the plate cylinder 1-31. Upon reception of the loader contact signal, the automatic plate replacing apparatus 4-3 causes its loader 83-3 to incline to the position of the alternate long and short dashed line in FIG. 17. The distal end of the loader 83-3 comes close to the circumferential surface of the plate cylinder 1-31. When the leading-side plate lockup opening signal and the trailing-side plate lockup opening signal are generated, a plate removal operation is started in the printing unit 1-3 (time t2 in FIG. 16B). More specifically, leading- and trailing-side plate lockup devices 1-32 and 1-33 attached to the plate cylinder 1-31 are opened, and the leading- and trailing-edge portions of an old plate 14-3 mounted on the circumferential surface of the plate cylinder 1-31 are set free. The CPU 205 reads plate removal positions of the remaining printing units in step 215, and selects the nearest plate removal position in the reverse direction, i.e., the plate removal position of the printing unit 1-2 (step 322). The plate cylinders 1-11 to 1-41 are synchronously rotated in the reverse direction. During synchronous rotation, the old plate 14-3 located on the circumferential surface of the plate cylinder 1-31 is received by the loader 83-3 of the automatic plate replacing apparatus 4-3 from its trailing edge, and plate removal progresses. When the plate cylinder 1-21 reaches a position angularly displaced from the position of FIG. 20D by the angle 03, this angular position is determined as the plate removal position, and synchronous rotation of the plate cylinders 1-11 to 1-41 is stopped. The loader 83-2 is inclined as indicated by the alternate long and short dashed line in FIG. 17, and the plate removal operation is started in the printing unit 1-2 (time t3 in FIG. 16C). Leading- and trailing plate lockup devices 1-22 and 1-23 attached to the plate cylinder 1-21 are opened so that the leading- and trailing-edge portions of an old plate 14-2 mounted on the circumferential surface of the plate cylinder 1-21 are set free. Upon subsequent synchronous rotation of the plate cylinders 1-11 to 1-41, the old plate 14-2 is received by the loader 83-2 of the automatic plate replacing apparatus 4-2 from its trailing end. The plate removal operation then progresses. When the plate cylinder 1-11 reaches a position angularly displaced from the position of FIG. 20D by the angle 83, this angular position is determined as the plate removal position, and synchronous rotation of the plate cylinders 1-11 to 1-41 is stopped. The loader 83-1 is inclined as indicated by the alternate long and short dashed line in FIG. 17, and the plate removal operation is started in the printing unit 1—1 (time t4 in FIG. 16D). Leading- and trailing plate lockup devices 1-12 and 1-13 attached to the plate cylinder 1-11 are opened so that the leading- and trailing-edge portions of an old plate 14-1 mounted on the circumferential surface of the plate cylinder 1-11 are set free. Upon subsequent synchronous rotation of the plate cylinders 1-11 to 1-41, the old plate 14-1 is received by the loader 83-1 of the automatic plate replacing apparatus 4-1 from its trailing end. The plate removal operation then progresses.

Figures 16A, 16B, 16C, 16D:
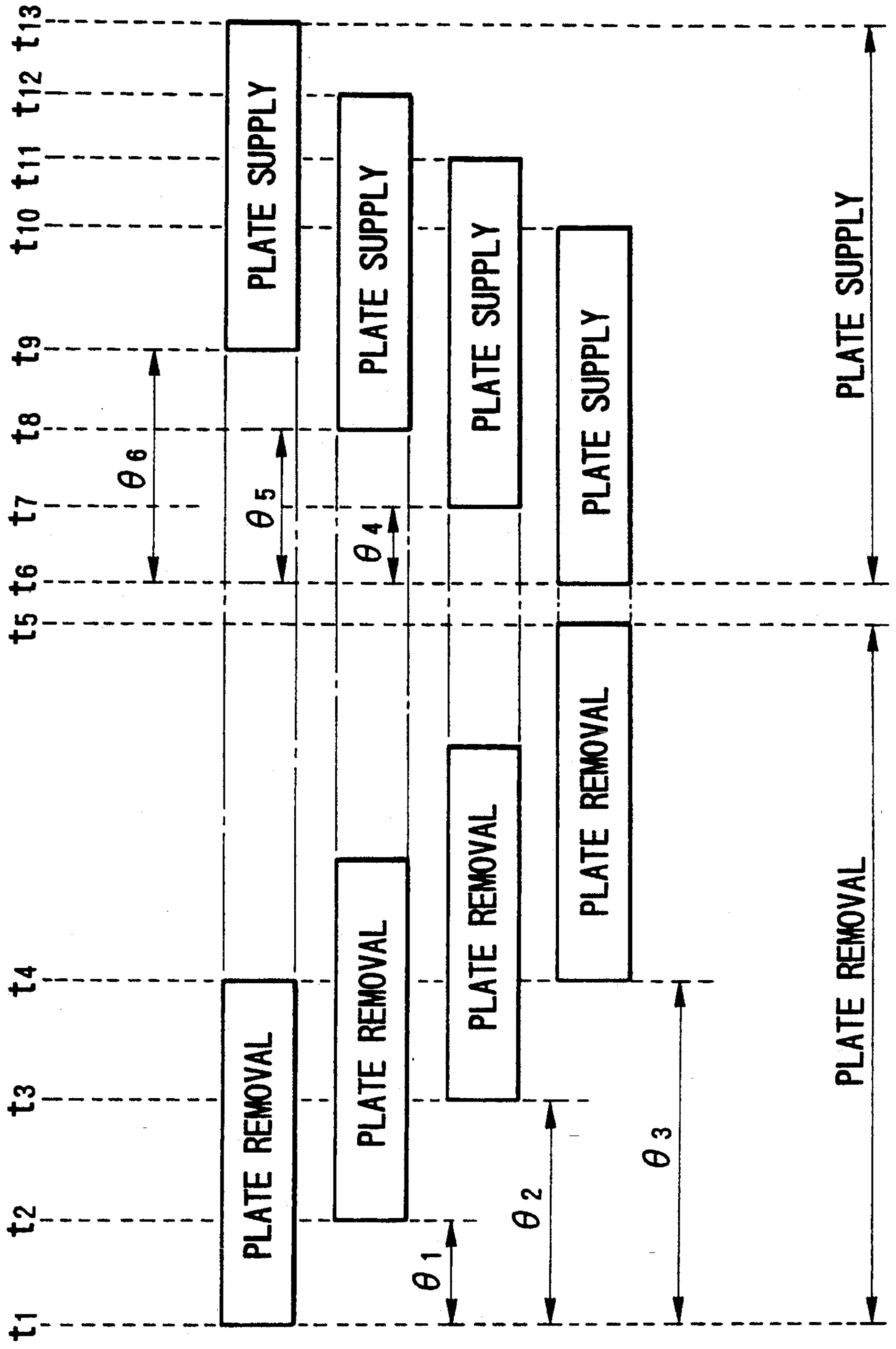
Figure 21A:
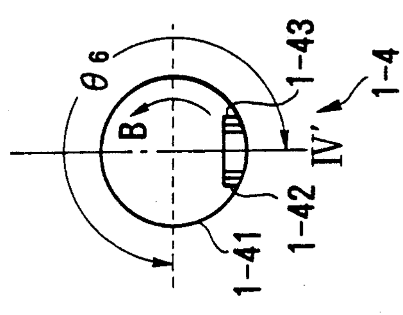
Figure 21B:
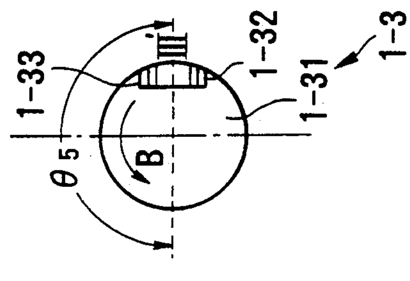
Figure 21C:
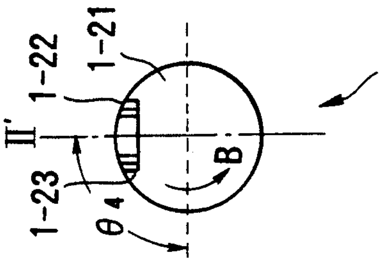
Figure 21D:
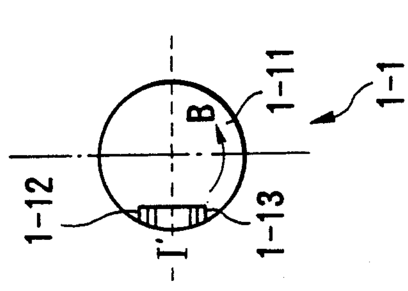

In step 322, when the CPU 205 determines that plate removal of all the printing units is completed, a plate supply position of the last printing unit whose plate removal is completed, i.e., the printing unit 1—1, is read by the CPU 205 (step 323). The CPU 205 outputs a motor reverse rotation signal (step 324) to synchronously rotate the plate cylinders 1-11 to 1-41 in the reverse direction. The CPU 205 checks whether the present position reaches the plate supply position of the printing unit 1—1 (step 326) while the present positions are kept read (step 325). If YES in step 326, i.e., the CPU 205 determines that the present position coincides with the plate supply position, the CPU 205 stops outputting the motor reverse rotation signal (step 327), thereby stopping rotation of the motor 202. Synchronous rotation of the plate cylinders 1-11 to 1-41 is stopped. The plate cylinder 1-11 is stopped at a plate supply position I' shown in FIG. 21D. During reverse rotation, time t5 shown in FIG. 16D is passed, so that removal of the old plate 14-1 has already been completed. At this time, the plate cylinder 1-21 is stopped at an angular position II' angularly spaced apart from the position I' by an angle 84, as shown in FIG. 21C, the plate cylinder 1-31 is stopped at an angular position III' angularly spaced part from the position I' by $\theta 5$, as shown in FIG. 21B, and the plate cylinder 1-41 is stopped at an angular position IV' angularly spaced apart from the position I' by an angle $\theta 6$, as shown in FIG. 21A.

In this state, the CPU 205 outputs a plate supply signal for instructing plate supply in the printing unit 1—1 (step 328). Upon reception of this plate supply signal, the control circuit 212 sends a plate insertion signal to the automatic plate replacing apparatus 4-1 and a leading-side plate lockup closing signal to the plate cylinder 1-11. Upon reception of the plate insertion signal, the automatic plate replacing apparatus 4-1 starts a plate supply operation (time t6 in FIG. 16D). A new plate 105 chucked and held in advance in a corresponding loader 83 is moved downward, and the leading-edge portion of the new plate 105 is inserted into the leading-side plate lockup device 1-12. When the leading-side plate lockup closing signal is generated, the leading-side plate lockup device 1-12 is closed while gripping the leading-edge portion of the new plate 105. The CPU 205 stores the number of the printing unit 1—1 as a unit whose plate supply has been completed (step 329). The CPU reads the plate supply positions of the remaining printing units and the trailing-side plate lockup closing position (step 330). The CPU 205 selects the nearest plate supply position or the trailing-side plate lockup closing position as the stop position in the normal or forward direction (step 331). More specifically, the CPU 205 selects a plate supply position or a trailing-side plate lockup closing position of a printing unit whose angular position reaches the plate supply position or the trailing-side plate lockup closing position first upon synchronous rotation of the plate cylinders 1-11 to 1-41 in a direction of an arrow B (normal direction) in FIGS. 21A to 21D. The CPU 205 determines whether the selected stop position is the plate supply position (step 322). If YES in step 322, the flow advances to step 333. Otherwise, the flow advances to step 340. In the phases shown in FIGS. 21A to 21D, the printing unit 1-2 reaches the plate supply position first. The flow advances to step 333.

The CPU 205 outputs a motor normal rotation signal in step 333 to synchronously rotate the plate cylinders 1-11 to 1-41 in the normal direction. During synchronous rotation, the new plate 105 is gradually wound around the circumferential surface of the plate cylinder 1-11, and supply of the new plate 105 progresses. During synchronous rotation of the plate cylinders 1-11 to 1-41, the angular positions of the plate replacing apparatuses which are detected by the rotary encoder 203 are sequentially changed. The CPU 205 continuously reads the angular positions as present positions (step 334) and determines whether the present position reaches the plate supply position of the printing unit 1-2 (step 335). If YES in step 335, the CPU 205 stops outputting the motor normal rotation signal (step 336) to stop rotation of the motor 202. The plate cylinders 1-11 to 1-41 are synchronously stopped. In this state, the plate cylinder 1-21 is stopped at an angular position spaced apart from the position of FIG. 21C by the angle 04, thus assuming the plate supply position.

In this state, the CPU 205 outputs a plate supply signal for instructing plate supply in the printing unit 1-2 (step 337). Upon reception of the plate supply signal, the control circuit 212 supplies a plate insertion signal to the automatic plate replacing apparatus 4-2 and a leading-side plate lockup closing signal to the plate cylinder 1-21. Upon reception of the plate insertion signal, the automatic plate replacing apparatus 4-2 starts a plate supply operation (time t7 in FIG. 16C), and a new plate 105 chucked and held in the corresponding loader is moved downward. The leading-edge portion of the new plate is inserted into the open leading-side plate lockup device 1-22. When the leading-side plate lockup closing signal is generated, the leading-side plate lockup device 1-22 is closed while gripping the leading-edge portion of the new plate 105. The CPU 205 stores the number of the printing unit 1-2 as a unit whose plate supply has been completed (step 338). The CPU 205 then determines whether plate supply of all the printing units is completed (step 339), and the flow returns to step 330.

In the next step 331, a plate supply position of the printing unit 1-3 is selected. In step 333 after step 332, the plate cylinders 1-11 to 1-41 are synchronously rotated in the normal direction, so that supply of the new plate 105 on the plate cylinder 1-21 progresses. When the plate cylinder 1-31 reaches a normal rotation position angularly spaced apart from the position of FIG. 21B by the angle 85, this angular position is given as the plate supply position, and the plate cylinders 1-11 to 1-41 are synchronously stopped. The plate supply operation of the printing unit 1-3 is started (time t8 in FIG. 16B). More specifically, a new plate 105 chucked and held by the automatic plate replacing apparatus 4-3 is moved downward, and the leading-side plate lockup device 1-32 is closed while gripping the leading-edge end portion of this new plate 105. The CPU 205 stores the number of the printing unit 1-3 as a unit whose plate supply has been completed, and the flow returns to step 330.

In the next step 331, a plate supply position of the printing unit 1-4 is selected. In step 333 after step 332, the plate cylinders 1-11 to 1-41 are synchronously rotated in the normal direction, so that supply of the new plate 105 on the plate cylinder 1-41 progresses. When the plate cylinder 1-41 reaches a normal rotation position angularly spaced apart from the position of FIG. 21A by the angle $\theta 5$, this angular position is given as the plate supply position, and the plate cylinders 1-11 to 1-41 are synchronously stopped. The plate supply operation of the printing unit 1-4 is started (time t9 in FIG. 16A). More specifically, a new plate 105 chucked and held by the automatic plate replacing apparatus 4-4 is moved downward, and the leading-side plate lockup device 1-42 is closed while gripping the leading-edge portion of this new plate 105. The CPU 205 stores the number of the printing unit 1-4 as a unit whose plate supply has been completed, and the flow returns to step 330.

In the next step 331, the trailing-side plate lockup position of the printing unit 1—1 is selected. For this reason, the flow advances to step 340 through step 332, and the number of the unit whose plate supply has been completed is read by the CPU 205. The CPU 205 then collates the read number of the unit whose plate supply has been completed with the number of a printing unit whose trailing-side plate lockup closing position is selected (step 341). If YES in step 341, the flow advances to step 342. In this case, since the printing unit 1—1 is detected as a unit whose plate supply has been completed, the flow actually advances to step 342. In step 342, the CPU 205 outputs a motor normal rotation signal to synchronously rotate the plate cylinders 1-11 to 1-41 in the normal direction. The CPU 205 continuously reads the present positions of the apparatuses (step 343) and determines whether the present position reaches the trailing-side plate lockup closing position of the printing unit 1—1 (step 344). When the CPU 205 determines that the present position coincides with the trailing-side plate lockup closing position, the CPU 205 stops outputting the motor normal rotation signal (step 345), thereby stopping rotation of the motor 202. Synchronous rotation of the plate cylinders 1-11 to 1-41 is stopped, and the plate cylinder 1-11 is stopped at a predetermined angular position, thereby assuming the trailing-side plate lockup closing position.

In this state, the CPU 205 supplies a trailing-side plate lockup closing signal to the printing unit 1—1 (step 346). When the trailing-side plate lockup closing signal is generated, the trailing-side plate lockup device 1-13 is closed while gripping the trailing-edge end portion of the new plate 105, and at the same time the loader 83-1 of the automatic plate replacing apparatus 4-1 is retracted. Therefore, supply of the new plate to the printing unit 1—1 is completed (time t10 in FIG. 16D). The CPU 205 determines whether plate supply of all the printing units has been completed (step 339). In step 331 after step 330, the trailing-side plate lockup closing position of the printing unit 1-2 is selected by the CPU 205. The operations in steps 340 to 346 are performed to complete the supply of the plate to the printing unit 1-2 (time t11 in FIG. 16C). Similarly, at time t12 in FIG. 16B, supply of the new plate to the printing unit 1-3 is completed. At time t13 in FIG. 16A, supply of the new plate to the printing unit 1-4 is completed. When the CPU 205 determines that supply of the new plates to all the printing units is completed, i.e., when the operation reaches time t13 in FIG. 16A, the flow advances to step 347. In this step, the CPU 205 outputs a safety cover closing signal. The safety covers 1-12 to 1-42 in the printing units 1—1 to 1-4 are closed.

In the above operations, for the sake of simplicity, the trailing-side plate lockup closing positions of all the printing units do not come before the plate supply position of any printing unit. However, when a trailing-side plate lockup closing position of a given printing unit comes before the plate supply start positions of the remaining printing units, the printing unit having the trailing-side plate lockup closing position selected in step 331 may not be a printing unit whose plate supply has been completed. In this case, the flow advances to step 348 through step 341. Plate supply positions and the trailing-side plate lockup closing positions of the remaining printing units except for the trailing-side plate lockup closing position of the given printing unit are stored in a submemory, the stored data are read out (step 349), and the flow returns to step 331.

In the above embodiment, the plates are automatically replaced with each other. However, the method of the present invention is equally applicable to manual replacement. In the above embodiment, the four-color printing press is exemplified. However, the present invention is also applicable to a printing press having two or more printing units.

As is apparent from the above description, according to the present invention, there is provided a plate replacing apparatus for a printing press, comprising a plate lockup opening/closing unit, connected to leading- and trailing-side plate lockup devices through a cam shaft, for opening/closing the leading- and trailing-side plate lockup devices upon pivotal movement of the cam shaft, a plate holding apparatus drive unit for driving a plate holding apparatus on the plate replacing apparatus between an operation position where a distal end portion of the plate holding apparatus comes close to the plate lockup devices and a storage position where the distal end portion of the plate holding apparatus is separated from the plate lockup devices, a plate removal unit for gripping an old plate released from the plate lockup devices and inserted into the plate holding apparatus upon rotation of the plate cylinder, and for moving the old plate into the plate holding apparatus, a plate supply unit for inserting a new plate loaded in the plate holding apparatus into the leading-side plate lockup device, a plate press unit for pressing the new plate inserted into the leading-side plate lockup device and wound around the circumferential surface of the plate cylinder and for inserting the other end of the new plate into the trailing-side plate lockup device, a predetermined plate position stop unit for pivoting the plate cylinder to stop at a plate gripper position, and a controller for operating the plate lockup opening/closing unit, the plate holding apparatus drive unit, the plate removal unit, the plate supply unit, the plate press unit, and the predetermined plate position stop unit at predetermined timings. Replacement of an old plate with a new plate, which is partially manually performed in a conventional apparatus, can be fully automatically performed. Therefore, skills are not required, energy savings can be achieved, the preparation time can be shortened, and productivity can be improved.

According to the present invention, there is provided a plate replacing apparatus for a printing press having a drive shaft operatively connected to a motor via a belt and a predetermined position stop unit for a plate cylinder, wherein a driven gear is mounted on the drive shaft, and the predetermined position stop unit comprises a driving gear movable to be meshed with or not to be meshed with the driven gear, and a motor, connected to the driving gear, for driving and rotating the driving gear by a predetermined angle. During printing, even if the driven side is overloaded, the belt slips, and the overload does not act on the motor side, thereby assuring safety. At the same time, at the time of plate replacement, the plate cylinder is stopped at the predetermined position, so that operational precision can be improved, and an operation error does not occur.

According to the present invention, there is also provided a method of replacing an old plate mounted on a circumferential surface of each of first to Nth plate cylinders with a new plate, comprising the steps of stopping a Jth ($1 \leq J < N$) plate cylinder at a plate removal position thereof to remove an old plate from the Jth plate cylinder, synchronously rotating the first to Nth plate cylinders in a reverse direction, stopping a Kth ($J < K \leq N$) plate cylinder at a plate removal position thereof to remove an old plate from the Kth plate cylinder, synchronously rotating the first to Nth plate cylinders in the reverse direction until an old plate is removed from the Nth plate cylinder, stopping the Nth plate cylinder at a plate supply position thereof to supply a new plate thereto, synchronously rotating the first to Nth plate cylinders in a normal direction, stopping the Kth plate cylinder at a plate supply position thereof to supply a new plate thereto, synchronously rotating the first to Nth plate cylinders in the normal direction, stopping the Jth plate cylinder at a plate supply position thereof to supply a new plate, and synchronously rotating the first to Nth plate cylinders in the normal direction until a new plate is supplied to the first plate cylinder. The total plate replacement time can be shorter than the sum of the plate removal and plate supply periods independently required in the respective printing units. Therefore, the preparation time can be shortened, working efficiency of the printing press can be improved, and the number of revolutions of the plate cylinder can be reduced.

What is claimed is:

1. A plate replacing apparatus for a printing press having a plate fixing apparatus consisting of a leading-side plate lockup device for gripping one end of a plate wound around a circumferential surface of a plate cylinder and a trailing-side plate lockup device for gripping the other end of the plate, said plate fixing apparatus being arranged in a gap in said circumferential surface of said plate cylinder, comprising:

a plate lockup opening/closing unit, connected to said leading- and trailing-side plate lockup devices through a cam shaft, for opening/closing said leading-and trailing-side plate lockup devices upon pivotal movement of said cam shaft;

a plate holding apparatus drive unit for driving a plate holding apparatus on said plate replacing apparatus between an operation position where a distal end portion of said plate holding apparatus comes close to said plate lockup devices and a storage position where said distal end portion of said plate holding apparatus is separated from said plate lockup devices;

a plate removal unit for gripping an old plate released from said plate lockup devices and inserted into said plate holding apparatus upon rotation of said plate cylinder, and for moving said old plate into said plate holding apparatus;

a plate supply unit for inserting a new plate loaded in said plate holding apparatus into said leading-side plate lockup device;

a plate press unit for pressing the new plate inserted into said leading-side plate lockup device and wound around said circumferential surface of said plate cylinder and for inserting the other end of the new plate into said trailing-side plate lockup device;

a predetermined plate position stop unit for pivoting said plate cylinder to stop at a plate gripper position; and a controller for operating said plate lockup opening/-closing unit, said plate holding apparatus drive unit, said plate removal unit, said plate supply unit, said plate press unit, and said predetermined plate position stop unit at predetermined timings.

2. A plate replacing apparatus according to claim 1, wherein said plate replacing apparatus further comprises:

a main motor with a driving shaft for driving a driven shaft of said plate cylinder with a belt; and said predetermined plate position stop unit including an auxiliary motor with gearing for selectively connecting said auxiliary motor to said driven shaft to rotate said plate cylinder by a predetermined angle.

* * * * *